(12) United States Patent
Stroila et al.

(10) Patent No.: US 10,359,295 B2
(45) Date of Patent: Jul. 23, 2019

(54) METHOD AND APPARATUS FOR PROVIDING TRAJECTORY BUNDLES FOR MAP DATA ANALYSIS

(71) Applicant: HERE Global B.V., Eindhoven (NL)

(72) Inventors: Matei Stroila, Chicago, IL (US); Bo Xu, Lisle, IL (US); Jane Macfarlane, Oakland, CA (US)

(73) Assignee: HERE Global B.V., Eindhoven (NL)

( * ) Notice: Subject to any disclaimer, the term of this patent is extended or adjusted under 35 U.S.C. 154(b) by 331 days.

(21) Appl. No.: 15/259,954

(22) Filed: Sep. 8, 2016

(65) Prior Publication Data

US 2018/0066957 A1  Mar. 8, 2018

(51) Int. Cl.
*G01C 21/32* (2006.01)
*G01C 21/34* (2006.01)
*G01C 21/36* (2006.01)

(52) U.S. Cl.
CPC ......... *G01C 21/3694* (2013.01); *G01C 21/32* (2013.01); *G01C 21/3446* (2013.01)

(58) Field of Classification Search
CPC . G01C 21/3694; G01C 21/32; G01C 21/3446
See application file for complete search history.

(56) References Cited

U.S. PATENT DOCUMENTS

| 2007/0129892 | A1* | 6/2007 | Smartt | G01C 21/32 702/5 |
| 2012/0116678 | A1* | 5/2012 | Witmer | G01C 21/32 702/5 |
| 2012/0277985 | A1* | 11/2012 | Witmer | G08G 1/09623 701/119 |
| 2013/0030690 | A1* | 1/2013 | Witmer | G01C 21/32 701/409 |

(Continued)

OTHER PUBLICATIONS

Karagiorgou et al., "On Vehicle Tracking Data-Based Road Network Generation", Proceedings of the 20th International Conference on Advances in Geographic Information Systems, Nov. 6-9, 2012, 10 Pages.

(Continued)

*Primary Examiner* — Thomas Ingram
(74) *Attorney, Agent, or Firm* — Ditthavong & Steiner, P.C.

(57) ABSTRACT

An approach is provided for generating trajectory bundles for map data analysis. The approach involves receiving probe data associated with the bounded geographic area. The probe data are collected from sensors of a plurality of devices traveling in the bounded geographic area, and includes probe points indicating a position, a heading, a speed, a time, or a combination thereof. The approach also involves constructing a plurality of trajectories from the probe points to represent respective movement paths of said each of the plurality of devices. The approach further involves computing similarities among a plurality of curves (Continued)

represented by the plurality of trajectories. The approach further involves clustering the plurality of trajectories into trajectory bundles based on the similarities with each bundle representing a possible maneuver within the bounded geographic area. The approach further involves generating a map of the bounded geographic area based on the trajectory bundles.

20 Claims, 17 Drawing Sheets

(56) References Cited

U.S. PATENT DOCUMENTS

| | | | | |
|---|---|---|---|---|
| 2013/0085659 | A1* | 4/2013 | Bekaert | G01C 21/26 701/118 |
| 2013/0218466 | A1* | 8/2013 | Twardowski | G01C 21/32 701/533 |
| 2013/0286198 | A1 | 10/2013 | Fan et al. | |
| 2014/0163875 | A1* | 6/2014 | Mund | G01C 21/32 701/532 |
| 2014/0277900 | A1* | 9/2014 | Abhyanker | G01C 21/32 701/25 |
| 2015/0285656 | A1* | 10/2015 | Verheyen | G01C 21/32 701/428 |
| 2015/0369615 | A1* | 12/2015 | Dzyuba | G01C 21/30 701/409 |
| 2016/0102984 | A1 | 4/2016 | Dorum | |
| 2016/0102986 | A1 | 4/2016 | Ma et al. | |
| 2016/0225255 | A1* | 8/2016 | Thakur | G08G 1/0112 |

OTHER PUBLICATIONS

Guan et al., "Using Relative Distance and Hausdorff Distance to Mine Trajectory Clusters", TELKOMNIKA, Jan. 2013, vol. 11, No. 1, pp. 115-122.

Schroedl et al., "Mining GPS Traces for Map Refinement", Data Mining and Knowledge Discovery, 9, Jul. 2004, vol. 9, Issue 1, pp. 59-87.

Morris et al., "Learning Trajectory Patterns by Clustering: Experimental Studies and Comparative Evaluation", IEEE Conference on Computer Vision and Pattern Recognition, 2009, Jun. 20-25, 2009, pp. 312-319.

Office Action for corresponding European Patent Application No. 17189284.7-1003, dated Jan. 19, 2018, 13 pages.

Jaeseong et al., "TravelMiner: On the Benefit of the Path-Based Mobility Prediction", published in 2016 13th Annual IEEE International Conference on Sensing, Communication, and Networking (SECON), Jun. 2016, 9 pages.

* cited by examiner

METHOD AND APPARATUS FOR PROVIDING TRAJECTORY BUNDLES FOR MAP DATA ANALYSIS

BACKGROUND

Mapping-related service providers (e.g., map data providers, navigation service providers, etc.) face significant technical challenges when generating and updating mapping data, and when analyzing such mapping data to provide mapping and navigation services to end users (e.g., consumers, original equipment manufacturers, etc.). One area of development has been related to generating, updating, and/or analyzing map data through use of probe data (e.g., location data collected by devices and/or vehicles equipped with sensors to report location, heading, speed, time, etc. as they travel in a road network). However, because probe data is generally reported as discrete points of data, service providers are challenged to develop automated processes for organizing and manipulating probe data to facilitate map data creation and analysis, particularly when the volume of available probe data is very high.

SOME EXAMPLE EMBODIMENTS

Therefore, there is a need for an approach for processing probe data collected from a bounded geographic area (e.g., a geographic area including an intersection or highway interchange) into trajectory bundles that can be used for map data analysis, map data creation, and/or map data update.

According to one embodiment, a method comprises receiving probe data associated with the bounded geographic area. The probe data are collected from one or more sensors of a plurality of devices traveling in the bounded geographic area, and includes probe points indicating a position, a heading, a speed, a time, or a combination thereof of each of the plurality of devices. The method also comprises constructing a plurality of trajectories from the probe points for said each of the plurality of devices. The plurality of trajectories represent respective movement paths of said each of the plurality of devices within the bounded geographic area. The method further comprises computing similarities among a plurality of curves represented by the plurality of trajectories. The method further comprises clustering the plurality of trajectories into one or more trajectory bundles based on the similarities. The one or more trajectory bundles respectively represent a possible maneuver within the bounded geographic area. The method further comprises generating a map of the bounded geographic area based on the one or more trajectory bundles.

According to another embodiment, an apparatus comprises at least one processor, and at least one memory including computer program code for one or more computer programs, the at least one memory and the computer program code configured to, with the at least one processor, cause, at least in part, the apparatus to receive probe data associated with the bounded geographic area. The probe data are collected from one or more sensors of a plurality of devices traveling in the bounded geographic area, and includes probe points indicating a position, a heading, a speed, a time, or a combination thereof of each of the plurality of devices. The apparatus is also caused to construct a plurality of trajectories from the probe points for said each of the plurality of devices. The plurality of trajectories represent respective movement paths of said each of the plurality of devices within the bounded geographic area. The apparatus is further caused to compute similarities among a plurality of curves represented by the plurality of trajectories. The apparatus is also caused to cluster the plurality of trajectories into one or more trajectory bundles based on the similarities. The one or more trajectory bundles respectively represent a possible maneuver within the bounded geographic area. The apparatus is further caused to generate a map of the bounded geographic area based on the one or more trajectory bundles.

According to another embodiment, a computer-readable storage medium carries one or more sequences of one or more instructions which, when executed by one or more processors, cause, at least in part, an apparatus to receive probe data associated with the bounded geographic area. The probe data are collected from one or more sensors of a plurality of devices traveling in the bounded geographic area, and includes probe points indicating a position, a heading, a speed, a time, or a combination thereof of each of the plurality of devices. The apparatus is also caused to construct a plurality of trajectories from the probe points for said each of the plurality of devices. The plurality of trajectories represent respective movement paths of said each of the plurality of devices within the bounded geographic area. The apparatus is further caused to compute similarities among a plurality of curves represented by the plurality of trajectories. The apparatus is also caused to cluster the plurality of trajectories into one or more trajectory bundles based on the similarities. The one or more trajectory bundles respectively represent a possible maneuver within the bounded geographic area. The apparatus is further caused to generate a map of the bounded geographic area based on the one or more trajectory bundles.

According to another embodiment, an apparatus comprises means for receiving probe data associated with the bounded geographic area. The probe data are collected from one or more sensors of a plurality of devices traveling in the bounded geographic area, and includes probe points indicating a position, a heading, a speed, a time, or a combination thereof of each of the plurality of devices. The apparatus also comprises means for constructing a plurality of trajectories from the probe points for said each of the plurality of devices. The plurality of trajectories represent respective movement paths of said each of the plurality of devices within the bounded geographic area. The apparatus further comprises means for computing similarities among a plurality of curves represented by the plurality of trajectories. The apparatus further comprises means for clustering the plurality of trajectories into one or more trajectory bundles based on the similarities. The one or more trajectory bundles respectively represent a possible maneuver within the bounded geographic area. The apparatus further comprises means for generating a map of the bounded geographic area based on the one or more trajectory bundles.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing trajectory bundles for map data analysis are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
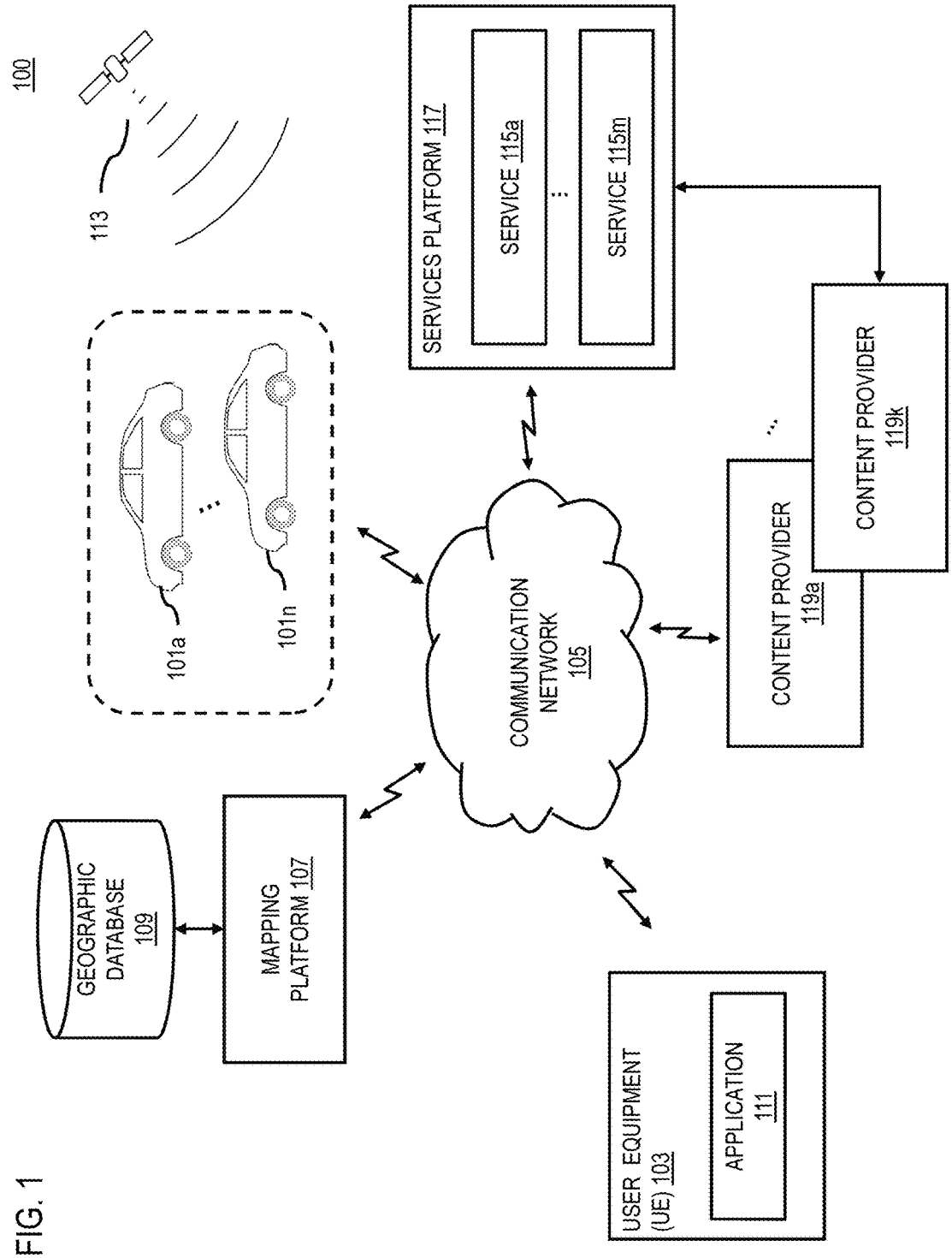
FIG. 1 is a diagram of a system capable of providing trajectory bundles for map data analysis, according to one embodiment.

FIG. 1 is a diagram of a system capable of providing trajectory bundles for map data analysis, according to one embodiment. Service providers can use probe data to analyze map features (e.g., street intersections, highway interchanges, or any other location where multiple possible maneuvers can be made by a traveler). For example, typical questions that this analysis tries to answers include, but are not limited to: (a) what are the possible driving maneuvers (e.g., turns, u-turns, etc.) at a given location? (b) what are the probabilities that a particular turn or highway interchange will be taken? (c) are there any delays at a turn or highway interchange? (d) are there points of interest (hereinafter "POIs") close to the location, intersection, or highway interchange that are impacting traffic", etc.

Historically, such analysis (e.g., intersection analysis) is performed by first map mapping the probe data or by using polygons defined by the map to group trajectories specific to a possible maneuver (e.g., a driving maneuver). However, because of inaccuracies in geo-positioning, map matching generally has a higher error rate at locations where multiple maneuvers are possible such as at intersections, highway interchanges, etc. Defining polygons based on the map geometry to group trajectories can also be difficult due to the diverse geometric configurations at locations such as intersections and highway interchanges.

To address this problem, a system 100 of FIG. 1 introduces the capability to automatically group the trajectories passing through or otherwise traveling within a bounded geographic area (e.g., a geographic area containing an intersection, highway interchange, etc.), wherein the grouping or clustering is based on computing the similarities of curves represented by the trajectories. In one embodiment, for instance, given a time range and the geo-coordinates of the center of the intersection, highway interchange, or other location, the system 100 extracts corresponding probe data in bounding box centered there. By way of example, the size and/or shape of the bounding box (e.g., which defines the bounded geographic area of interest) can be fixed (e.g., 200 meter radius from the specified central geo-coordinate), or can vary depending on the local map geometry.

As shown in FIG. 1, the system 100 comprises one or more vehicles 101*a*-101*n* (also collectively referred to as vehicles 101) and/or one or more user equipment devices (UEs) 103 that act as probes traveling over a road network. Although the vehicles 101 are depicted as automobiles, it is contemplated that the vehicles 101 can be any type of transportation vehicle manned or unmanned (e.g., planes, aerial drone vehicles, motor cycles, boats, bicycles, etc.), and the UEs 103 can be associated with any of the types of vehicles or a person or thing traveling within the bounded geographic area (e.g., a pedestrian). In one embodiment, each vehicle 101 and/or UE 103 is assigned a unique probe identifier (probe ID) for use in reporting or transmitting probe data collected by the vehicles 101 and UEs 103. The vehicles 101 and UEs 103, for instance, are part of a probe-based system for collecting probe data for measuring traffic conditions in a road network. In one embodiment, each vehicle 101 and/or UE 103 is configured to report probe data as probe points, which are individual data records collected at a point in time that records telemetry data for that point in time. The probe points can be reported from the vehicles 101 and/or UEs 103 in real-time, in batches, continuously, or at any other frequency requested by the system 100 over, for instance, the communication network 105 for processing by the mapping platform 107.

In one embodiment, a probe point can include attributes such as: (1) probe ID, (2) longitude, (3) latitude, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 201 may include sensors for reporting measuring and/or reporting attributes. The attributes can also be any attribute normally collected by an on-board diagnostic (OBD) system of the vehicle, and available through an interface to the OBD system (e.g., OBD II interface or other similar interface).

In one embodiment, the system 100 builds the trajectory using probe provider information and/or probe identifier (probe ID) information associated with the probe data. For example, the system 100 builds the trajectories by matching the probe points in the probe data according to probe identifier and sequencing the probe points according to time. In this way, the trajectory can identify the movement path of the respective probe or device within the bounded geographic area over a time range covered by the probe data. Because the trajectories are made of individual probe points, each point in the trajectory also has the properties or attributes recorded for each probe point. For example, at any given point along the trajectory, a heading, speed, position, etc. of the probe point can be determined. In an example visualization of a trajectory, each segment or point along the trajectory can be color-coded to indicate a heading and/or speed of the probe, while the trajectory path traces the location of the probe in time.

In one embodiment, it is noted that the trajectory is determined with respect to position information recorded in probe point and is not map matched or otherwise referenced to underlying map data or a topology of the underlying road network represented in the map data associated with the bounded geographic area. In other words, the embodiments described herein advantageously eliminates the need for computational resources associated with map matching the probe data to create the trajectories. This process also advantageously eliminates the error introduced by the geospatial inaccuracies introduced by map matching. Similarly, the various embodiments described herein also advantageously eliminates the computational resources needed to define polygons containing groups of trajectories as well as the errors associated therewith. If the probe point data includes altitude information, the trajectory can also be a trajectory through an airspace (e.g., to track aerial drones, planes, other aerial vehicles, etc.).

In one embodiment, the system 100 then computes a similarity of curves or paths represented by trajectories built from the probe data. For example, the system 100 computes a metric indicating how similar a path traced by one trajectory to a path traced by another trajectory. In one embodiment, the metric is based on a computing a discrete Frechet distance, a dynamic time warping analysis, or a combination thereof. By way of example, the Frechet distance represents the shortest distance that couples a first curve to a second curve at similar points along the curves by taking into account the location and ordering of the points along the curves (e.g., by not allowing backtracking at any points at which the first curve and the second curve are coupled). The exact Frechet distance between two polygonal curves is in time $O(pq \log^2 pq)$, where p and q are the number of segments on the polygonal curves. Although it is contemplated that the exact Frechet distance computation can be used with the embodiments described herein, the algorithm is based on a parametric search and can be computationally intensive to perform. Accordingly, in one embodiment, a discrete Frechet distance is computed in place of the exact Frechet distance. The discrete Frechet distance is also known as the coupling distance, and is calculated based on a coupling distance between all possible couplings between the end points of line segments of the polygonal curves being compared. This distance provide a good approximation of the exact Frechet distance. This calculation is generally less computationally intensive (in time $O(pq)$) than calculating the exact Frechet distance.

In one embodiment, because the probe points making up the trajectory curves being compared are associated with time, a dynamic time warping analysis can be used to compute the similarity of the curves. Dynamic time warping is based on non-linearly varying the time dimension of two curves to find an optimal match or distance between two similar points of the curves. In this way, deceleration and/or acceleration differences between two similar curves can be adjusted for when computing similarity. In general, calculating similarity using dynamic time warping is also less computationally intensive than calculating the exact Frechet distance.

The above descriptions of the exact Frechet distance, the discrete Frechet distance and the dynamic time warping analysis are provided merely for illustrating various processes for calculating a similarity between curves represented by individual trajectories constructed by the system 100, and is not intended as limitations to the embodiments described herein. It is contemplated that any suitable means available for similarly computing curve similarity can be used with the embodiments described herein.

In one embodiment, the system 100 then clusters the trajectories using a clustering method. It is contemplated that any clustering method can be used to group trajectories together into trajectory bundles based on one or more characteristics of the trajectories. In one embodiment, the similarities of the curves (e.g., discrete Frechet distances) represented by each trajectory can be used to cluster into trajectory bundles. For example, clustering results in creating trajectory bundles are composed of those trajectories that have similar curve shapes (e.g., have discrete Frechet distances below a clustering threshold) and/or other similar trajectory properties (e.g., heading, speed, etc.). Example of clustering methods that can be used with the embodiments described here include, but are not limited to, methods known in the art such as Density-Based Spatial Clustering of Applications with Noise (DBSCAN), Ordering Points to Identify the Clustering Structure (OPTICS), spectral clustering, and the like.

In one embodiment, because the trajectories bundles represent a cluster of multiple trajectories that describe a similar movement path through space within the bounded geographic area of interest, the system 100 designates each bundle as representing a possible maneuver within the bounded geographic area of interest. In a use case where the bounded geographic area is centered around or includes an intersection, highway interchange, or similar road structure, the bundles represent possible maneuvers (e.g., turns, interchange selection, etc.) with respect to the intersection or interchange.

In one embodiment, the system 100 can then use the trajectory bundles and/or the possible maneuvers that they represent to generate a map of the bounded geographic area (e.g., mapping paths through an intersection or interchange) even when the underlying map topology is not used, known, or otherwise unavailable. For example, the use of trajectory bundles to map an area can advantageously enable the system 100 to automatically map even open areas where there is no underlying road network based solely on the trajectory bundles. By way of example, these open areas include but are not limited to park areas with no paths, paths through an airspace used by aerial vehicles, public pedestrian spaces with no defined walk ways, etc.

In one embodiment, the system 100 can generate the map by displaying all trajectories within a trajectory bundle to present the path or maneuver represented by the trajectory. In addition or alternatively, the system 100 can select a representative trajectory from among the trajectories within the bundle to represent the trajectory bundle in a map. This representative trajectory may be selected using any means. Example selection methods include, but are not limited to, selecting a trajectory that is in a most central location of the trajectory bundle, selecting trajectory bundle based on a computed curve fit or distance (e.g., discrete Frechet distance), etc. In another embodiment, the system 100 may generate a representative trajectory by a statistical process (e.g., averaging or finding a mean of the trajectories within the trajectory bundle).

In one embodiment, the system 100 can use the trajectory bundles to further analyze map data or other travel data associated with the bounded geographic area of interest. For example, the relative trajectory counts within each bundle (e.g., number of trajectories clustered or grouped into each trajectory bundle) can be used to indicate a travel characteristic such as a mode of transportation (e.g., driving, bicycling, pedestrians, etc.). Probe data, for instance, comes from devices (e.g., vehicles 101 and UEs 103) associated with diverse modes of transportation. In one embodiment, the system 100 can analyze the trajectory counts to infer a mode of transportation associated with a trajectory bundle. For example, in an example roadway, trajectory bundles with relatively high trajectory counts can be associated with an automobile as the mode of transportation, while trajectory bundles with relatively low trajectory counts can be associated with bicycling or pedestrian as the mode of transportation in cases when the roadway is known to be designed for automobile travel (e.g., a highway where pedestrian/bicycling traffic is restricted) or when a probe data provider indicates a relative expected occurrence of the modes of transport.

In another embodiment, the relative trajectory counts can be used to distinguish typical/allowed maneuvers from atypical/non-allowed maneuvers. For example, a possible maneuver represented by a trajectory bundle with a relatively high trajectory count can be classified by the system 100 to be a typical maneuver (e.g., a maneuver that a driver or traveler is typically expected to make in the bounded geographic area or at an intersection/interchange) or an allowed maneuver (e.g., a maneuver permitted by traffic rules based on an assumption that most drivers or travelers will perform only allowed maneuvers). On the other hand, the system 100 can classify a possible maneuver represented by a trajectory bundle with a relatively low trajectory count as an atypical (e.g., a maneuver a driver or traveler would not normally make at in an area or at an intersection/interchange) or a non-allowed maneuver (e.g., a maneuver not permitted by traffic rules based on an assumption that only a few drivers or travelers would break a traffic rule).

In one embodiment, the system 100 can determine the trajectory and possible maneuvers over a time series (e.g., for specific ranges of time over a larger time period) to detect changes in the classification of the maneuvers. For example, a possible maneuver associated with an initial low trajectory count may at a later time be associated with a high trajectory count if that maneuver has becomes an allowed maneuver at a later time. In another example case, an atypical maneuver may over time become a typical maneuver as more users begin adopting the maneuver. In one embodiment, these changes in traffic rules or classification can be automatically detected by the system 100 by generating the traffic bundles over a time series and comparing the characteristics of the bundles (e.g., trajectory counts) over the time series. Although trajectory count is discussed as an example characteristic, any other characteristic of the bundles or the trajectories/probe data within the bundles (e.g., speed, acceleration/deceleration as calculated form the speed and time information in the probe data, heading, etc.) can be analyzed over time to determine changes.

In another embodiment, maneuvers over a time series can also identify time-based traffic rules operating in a geographical area. For example, intersections where left turns are not permitted during a certain time period (e.g., 4 pm to 6 pm) would result in different relative counts of possible maneuvers during the period when left turns are not permitted. In this case, when left turns are not permitted at the intersection between 4 pm and 6 pm, a trajectory bundle associated with a left turn maneuver should have a relative low trajectory count because only a few drivers a likely to break the traffic rule. The system 100 can detect the differences in the trajectory counts over time to infer the time period in which the left turn is restricted without having prior knowledge of the traffic rule operating at the intersection.

In yet another example, traffic rules may designate which lanes flow in which direction during various times of day. For example, during morning rush hour, one or more traffic lanes of a roadway may be open for traffic moving towards a city center, and during evening rush hour, the lanes can be changed to permit traffic flowing away from the city center. In this case, differences in the trajectory counts of trajectory bundles associated with inbound traffic flows and outbound flows can be observed between the morning rush hour and the evening rush hour due to the change in directions of the lanes. Again, as in the above example, the system 100 can detect the differences in the trajectory counts of the inbound and outbound trajectory bundles over time to infer the timing of the lane direction changes.

In one embodiment, the system 100 can use the trajectory bundles to detect points of interest (POIs) in a bounded geographic area, or adjacent to an intersection/interchange if the area includes the feature. To detect a POI, for instance, the system 100 analyzes the topology of trajectory bundles with respect to the topology of a map feature such as roads within the geographic area of interest. For example, trajectory bundles that do not follow the topology of the road typically correspond to POIs adjacent to the road network (e.g., gas stations, stores with parking lots, etc.). In one embodiment, the system 100 can analyze the bundle topology to detect specific deviations from the map topology such as (but not limited to) kinks, multiple self-intersections, etc. that may be indicative of POIs at or near the area of the detected deviations. In one embodiment, the system 100 may perform the POI detection process over a time series (as described above with respect to bundle classification) to determine changes in POIs over time.

In another embodiment, the system 100 can use the trajectory bundles to detect geographic areas that may be problematic for travelers or drivers (e.g., areas where driving may be confusing or susceptible to navigation errors such as missing a turn, making a wrong turn, etc.). For example, the system 100 can analyze the trajectory bundles to determine whether they include maneuvers that might indicate that a traveler or driver has a problem with navigating or driving in the area. In one embodiment, the system 100 can designate making a U-turn as one possible maneuver for indicating a problem area. A U-turn is provided by of illustration and not limitation, and it is contemplated that the system 100 can designate any type maneuver as potentially indicative of a problem (e.g., slowing down excessively beyond a threshold, multiple self-intersections, etc.). The system 100 can then process the trajectory bundles to determine which of these bundles include the designated problem maneuver (e.g., a U-turn). The system 100 then determines a prevalence of the bundles with the designated problem maneuver among the overall trajectory bundles associated with the geographic area (e.g., their respective weights in the area, intersection, interchange, etc.). If the prevalence of the bundles with the designated problem maneuver is above a threshold, then the system 100 can designate the area, intersection, interchange, etc. as problematic.

It is noted that the example use cases for trajectory bundles are provided as example embodiments and are not intended to be limiting with respect to the use of trajectory bundles for map data or travel-related analysis.

As shown in FIG. 1 and described above, the vehicles 101 and UEs 103 of system 100 are part of a probe data collection system that transmits or otherwise collects probe data for processing by the mapping platform 107 over the communication network 105. The mapping platform 107 performs the processes for providing trajectory bundles for map data analysis as discussed with respect to the various embodiments described herein. In one embodiment, the mapping platform 107 can be a standalone server or a component of another device with connectivity to the communication network 105. For example, the component can be part of an edge computing network where remote computing devices (not shown) are installed along or within proximity of a road network to provide trajectory bundles from probe data collected locally or within a local area served by the remote or edge computing device.

In one embodiment, the mapping platform 107 has connectivity or access to a geographic database 109 that includes mapping data about a road network (additional description of the geographic database 109 is provided below with respect to FIG. 2). In one embodiment, the probe data can also be stored in the geographic database 109 by the mapping platform 107. In addition or alternatively, the probe data can be stored by another component of the system 100 in the geographic database 109 for subsequent retrieval and processing by the mapping platform 107.

In one embodiment, the vehicles 101 and/or UEs 103 may execute an application 111 to present or use the results of analyzing the trajectory bundles generated by the mapping platform 107. For example, if the application 111 is a navigation application then the trajectory bundles (and the possible maneuvers they represent) can be used to determine routing information, provide updated estimated times of arrival (ETAs), provide notifications of new POIs, provide notifications of potentially problematic areas/intersections/interchanges, and the like.

By way of example, the UE 103 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 may be associated with a vehicle 101 (e.g., cars), a component part of the vehicle 101, a mobile device (e.g., phone), and/or a combination of thereof. Similarly, the vehicle 101 may include computing components that can be perform all or a portion of the functions of the UE 103.

By way of example, the application 111 may be any type of application that is executable at the vehicle 101 and/or the UE 103, such as mapping application, location-based service applications, navigation applications, content provisioning services, camera/imaging application, media player applications, social networking applications, calendar applications, and the like. In one embodiment, the application 111 may act as a client for the mapping platform 107 and perform one or more functions of the mapping platform 107 alone or in combination with the platform 107.

In one embodiment, the vehicles 101 and/or the UEs 103 are configured with various sensors for generating probe data. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, switch sensors for determining whether one or more vehicle switches are engaged, and the like.

In another embodiment, the sensors of the vehicles 101 and/or UEs 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors may detect weather data, traffic information, or a combination thereof. In one example embodiment, the vehicles 101 and/or UEs 103 may include GPS receivers to obtain geographic coordinates from satellites 113 for determining current location and time associated with the vehicle 101 and/or UE 103 for generating probe data. Further, the location can be determined by a triangulation system such as A-GPS, Cell of Origin, or other location extrapolation technologies.

The communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 107 may be a platform with multiple interconnected components. The mapping platform 107 may include multiple servers, intelligent networking devices, computing devices, components and corresponding software for providing trajectory bundles for map data analysis. In addition, it is noted that the mapping platform 107 may be a separate entity of the system 100, a part of the one or more services 115a-115m (collectively referred to as services 115) of the services platform 117, or included within the UE 103 (e.g., as part of the applications 111).

The services platform 117 may include any type of service 115. By way of example, the services 115 may include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 117 may interact with the mapping platform 107, the UE 103, and/or the content provider 119 to provide the services 115.

In one embodiment, the content providers 119a-119k (collectively referred to as content providers 119) may provide content or data to the vehicles 101 and/or UEs 103, the mapping platform 107, and/or the services 115. The content provided may be any type of content, such as textual content, audio content, video content, image content, etc. In one embodiment, the content providers 119 may provide content that may aid in the detecting and classifying of a traffic jam from probe data. In one embodiment, the content providers 119 may also store content associated with the vehicles 101, the UE 103, the mapping platform 107, and/or the services 115. In another embodiment, the content providers 119 may manage access to a central repository of data, and offer a consistent, standard interface to data, such as a repository of probe data, speed limit for one or more road links, speed information for at least one vehicle, traffic jam threshold for at least one road link, other traffic information, etc. Any known or still developing methods, techniques or processes for retrieving and/or accessing features for road links from one or more sources may be employed by the mapping platform 107.

By way of example, the vehicles 101, the UEs 103, the mapping platform 107, the services platform 117, and the content providers 119 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
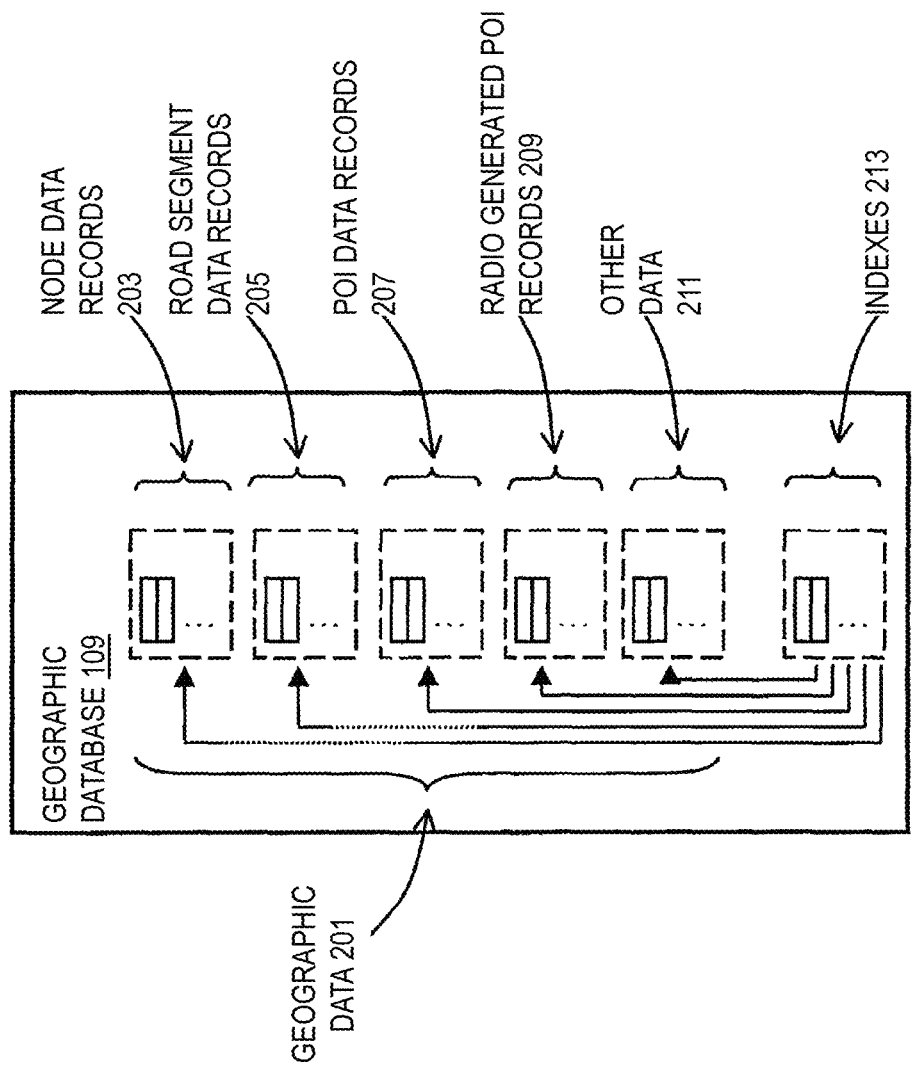
FIG. 2 is a diagram of a geographic database, according to one embodiment.

FIG. 2 is a diagram of the geographic database 109 of system 100, according to exemplary embodiments. In the exemplary embodiments, POIs and map generated POIs data can be stored, associated with, and/or linked to the geographic database 109 or data thereof. In one embodiment, the geographic database 109 includes geographic data 201 used for (or configured to be compiled to be used for) mapping and/or navigation-related services, such as for personalized route determination, according to exemplary embodiments. For example, the geographic database 109 includes node data records 203, road segment or link data records 205, POI data records 207, radio generated POI records 209, and other data records 211, for example. More, fewer or different data records can be provided. In one embodiment, the other data records 211 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 205 are links or segments representing roads, streets, or paths, as can be used in the calculated route or recorded route information for determination of one or more personalized routes, according to exemplary embodiments. The node data records 203 are end points corresponding to the respective links or segments of the road segment data records 205. The road link data records 205 and the node data records 203 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 207. The geographic database 109 can also include data about places, such as cities, towns, or other communities, and other geographic features, such as bodies of water, mountain ranges, etc. Such place or feature data can be part of the POI data records 207 or can be associated with POIs or POI data records 207 (such as a data point used for displaying or representing a position of a city). In addition, the geographic database 109 can include data from radio advertisements associated with the POI data records 207 and their respective locations in the radio generated POI records 209. By way of example, a street is determined from the user interaction with the UE 103 and the content information associated with UE 103, according to the various embodiments described herein.

The geographic database 109 can be maintained by the content provider 119 in association with the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database 109 or data in the master geographic database 109 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 109 can be a master geographic database, but in alternate embodiments, the geographic database 109 can represent a compiled navigation database that can be used in or with end user devices (e.g., vehicle 101, UE 103, etc.) to provide navigation-related functions. For example, the geographic database 109 can be used with the end user device to provide an end user with navigation features. In such a case, the geographic database 109 can be downloaded or stored on the end user device (e.g., vehicle 101, UE 103, etc.), such as in application 111, or the end user device can access the geographic database 109 through a wireless or wired connection (such as via a server and/or the communication network 105), for example.

In one embodiment, the end user device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 103) can be a cellular telephone. An end user can use the device navigation functions such as guidance and map display, for example, and for determination of route information to at least one identified point of interest, according to exemplary embodiments.

Figure 3:
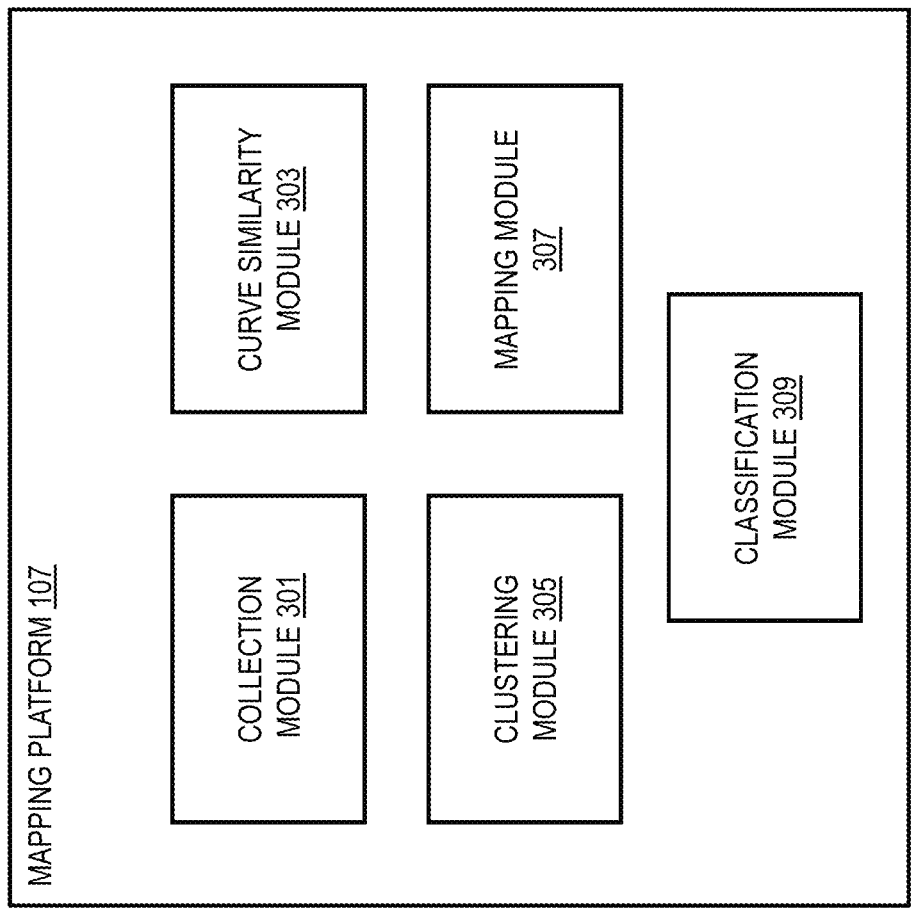
FIG. 3 is a diagram of the components of a mapping platform, according to one embodiment.

FIG. 3 is a diagram of the components of the mapping platform 107, according to one embodiment. By way of example, the mapping platform 107 includes one or more components for providing trajectory bundles for map data analysis. It is contemplated that the functions of these components may be combined in one or more components or performed by other components of equivalent functionality. In this embodiment, the mapping platform 107 includes a collection module 301, a curve similarity module 303, a clustering module 305, a mapping module 307, and a classification module 309.

In one embodiment, the collection module 301 may assemble probe data from one or more devices associated with one or more vehicles, one or more users, or a combination thereof into one or more trajectories. In one embodiment, the probe data are collected from a bounded geographic area specified as an area of interest. In one embodiment, the collection module 301 is configured to collect the probe data for the area for a specified time range. By way of example, the one or more probe data includes probe identifier information, latitude data, longitude data, altitude data, speed information, heading information, or a combination thereof. To construct the trajectories for each probe, the collection module 301 can query the probe data to identify probe points collected by a probe identified by its specific probe identifier. The probe points can then be sequenced based on time to construct the trajectory for the specified probe. In this way, the collection module 301 may determine one or more location points for the probe data in geographical space, time, or a combination thereof to construct a trajectory representing a user movement, a user activity, or a combination thereof for each probe represented in the probe data for the given time range.

In one embodiment, the curve similarity module 303 computes the similarity of the curves represented by each of the trajectories built by the collection module 301. As previously discussed, the curve similarity can be calculated using a similarity metric such as a discrete Frechet distance, a dynamic time warping analysis, or a combination thereof. In one embodiment, the curve similarity module 303 calculates similarity metrics (e.g., discrete Frechet distances) for all of the trajectories. Alternatively, the curve similarity module 303 can compute distances for a subset of the trajectories (e.g., if there is greater than a threshold number of trajectories built from the probe data).

In one embodiment, the curve similarity module 303 uses the discrete Frechet distance as the measure of curve similarity between trajectories. By way of example, the curve similarity module 303 can use the example code provided in Table 1 below to compute the Frechet distances of the trajectories, where dF(P,Q) is the discrete Frechet distance for polygonal curves $P=(u_1, \ldots, u_p)$ and $Q=(v_1, \ldots, v_q)$ and wherein the P and Q represent the curves of the trajectories being compared. It is noted that the example code of Table 1 is provided for illustration and is not intended as a limitation. The curve similarity module 303 can use any algorithm or code for determining curve similarity between trajectories.

TABLE 1

```
Function dF(P,Q): real;
    input: polygonal curves P = (u_1, ... , u_p) and Q = (v_1, ... , v_q).
    return: discrete Frechet distance (P,Q)
    ca : array [1..p, 1..q] of real;
    function c(i,j): real;
        begin
            if ca(i,j) > -1 then return ca(i,j)
            elsif i = 1 and j = 1 then ca(i,j) := d(u_1, v_1)
            elsif i > 1 and j = 1 then ca(i,j) := max{ c(i - 1, 1),
                d(u_i, v_1) }
            elsif i = 1 and j > 1 then ca(i,j) := max{ c(1,j - 1),
                d(u_1, v_j) }
```

TABLE 1-continued

```
            elsif i > 1 and j > 1 then ca(i,j) :=
                max{ min(c(i - 1,j), c(i - 1,j - 1),
                c(i,j - 1)), d(ui, vj) }
            else ca(i,j) = ∞
        return ca(i,j);
        end; /* function c */
    begin
        for i = 1 to p do for j = 1 to q do ca(i,j) := -1.0;
        return c(p, q);
    end.
```

In one embodiment, the curve similarity module 303 then provides the curve similarity information to the clustering module 305 for processing. The clustering module 305, for instance, clusters the trajectories into bundles based on the curve similarities and/or other features of the trajectories and/or probe points making up the trajectories. As discussed above, the clustering module 305 can use any clustering method to create the bundles and to group like trajectories within those bundles. Examples of these clustering methods include but are not limited to DBSCAN, OPTICS, spectral clustering, and the like.

For example, DBSCAN is a clustering method designed for large databases where, e.g., minimal domain knowledge is needed from input parameters, clusters may be of arbitrary shape (e.g., following arbitrary trajectory paths), and a large number records (e.g., trajectories) are to be processed). Example code for clustering using DBSCAN is provided below in Tables 2 and 3 by way of illustration and not limitation. Table 2 illustrates code for the DBSCAN clustering and Table 3 illustrates code for a function called by DBSCAN.

TABLE 2

```
DBSCAN (SetOfPoints, Eps, MinPts)
// SetOfPoints is UNCLASSIFIED
    ClusterId := nextId(NOISE);
    FOR i FROM 1 TO SetOfPoints.size DO
        Point := SetOfPoints.get(i);
        IF Point.ClId = UNCLASSIFIED THEN
            IF ExpandCluster(SetOfPoints, Point,
                ClusterId, Eps, MinPts) THEN
                ClusterId := nextId(ClusterId)
            END IF
        END IF
    END FOR
END; // DBSCAN
```

TABLE 3

```
ExpandCluster(SetOfPoints, Point, ClId, Eps, MinPts) : Boolean;
    seeds:=SetOfPoints.regionQuery(Point,Eps);
    IF seeds.size<MinPts THEN // no core point
        SetOfPoint.changeClId(Point,NOISE);
        RETURN False;
    ELSE // all points in seeds are density-reachable from Point
        SetOfPoints.changeClIds(seeds,ClId);
        seeds.delete(Point);
        WHILE seeds <> Empty DO
            currentP := seeds.first( );
            result := SetOfPoints.regionQuery(currentP, Eps);
            IF result.size >= MinPts THEN
                FOR i FROM 1 TO result.size DO
                    resultP := result.get(i);
                    IF resultP.ClId
                        IN {UNCLASSIFIED, NOISE } THEN
                        IF resultP.ClId = UNCLASSIFIED THEN
                            seeds.append(resultP);
                        END IF;
                        SetOfPoints.changeClId(resultP,ClId);
```

TABLE 3-continued

```
    END IF; // UNCLASSIFIED or NOISE
  END FOR;
  END IF; // result.size >= MinPts
    seeds.delete(currentP);
  END WHILE; // seeds <> Empty
  RETURN True;
 END IF
END; // ExpandCluster
```

In one embodiment, SetOfPoints in Tables 2 and 3 is either a set of all of the trajectories built from the probe data or a discovered cluster or trajectory bundle from a previous run of the clustering method. Eps (e.g., representing an extent of a spatial neighborhood from which to cluster) and MinPts (e.g., a minimum number of trajectories that are required for the neighborhood) are parameters describing a thinnest cluster that is to be determined from the trajectories. For example, to find a cluster, DBSCAN retrieves densities of trajectories reachable from a given starting point or a trajectory with respect to the specified Eps and MinPts parameters.

In one embodiment, the mapping module 307 uses the trajectory bundles to map possible maneuvers within a bounded geographic area of interest (e.g., intersection, highway interchange, etc.). For example, each trajectory bundle represents a path taken on one or more probes traveling through or within the area. The mapping module 307 can designate the trajectory bundles as possible maneuvers with respect to the area, intersection, interchange, etc. because the trajectories within the bundles represent movements that were actually observed. Accordingly, the mapping module 307 can generate a map of the area, intersection, interchange, etc. based only on mapping the trajectory bundles to geographic coordinates of a map without knowledge of a topology of any underlying road network. In other words, observing where probes travel in the bundles enables the mapping module 307 determine travel paths. If there is an underlying road network, the trajectory bundles would trace out paths along that road network without the system 100 needing to have prior topology information about the road network. In cases where there are no road networks (e.g., travel through open areas), then the map represents free-form paths most likely to be taken though that open area.

In one embodiment, the classification module 309 may classify the trajectory bundles resulting from the clustering by the clustering module 305 based on further analysis. For example, the classification module 309 can evaluate trajectory counts associated with traffic bundles to classify whether possible maneuvers associated represented by the traffic bundles are typical/atypical, allowed/non-allowed, etc. This classification, in turn, can be used to analyze traffic rules with respect to the area of interest (e.g., intersection, interchange, etc.). In one embodiment, the rules can be analyzed over a time series to automatically discover changes to traffic rules in those areas.

In one embodiment, the classification module 309 can also analyze the topologies of the trajectory bundles against existing map topologies (e.g., whether the two topologies follow each other). Where the bundle topology and the map topology do not agree or follow each other, the classification module 309 may classify the detected deviation as a possible POI. As with the traffic rules classification, the classification module 309 can monitor the development of POIs over a time series to determine changes to the POIs.

In yet another embodiment, the classification module 309 may analyze the trajectory bundles for maneuvers that are indicative of potential navigation problems (e.g., u-turns, excessive slow down when no slow is expected, multiple self-intersections, repeated loops, etc.). Based on the prevalence of these problematic bundles, the classification module 309 may classify an associated area, intersection, interchange, etc. as problematic or potentially problematic with respect to traveling or navigating through the area, intersection, interchange, etc.

Figure 4:
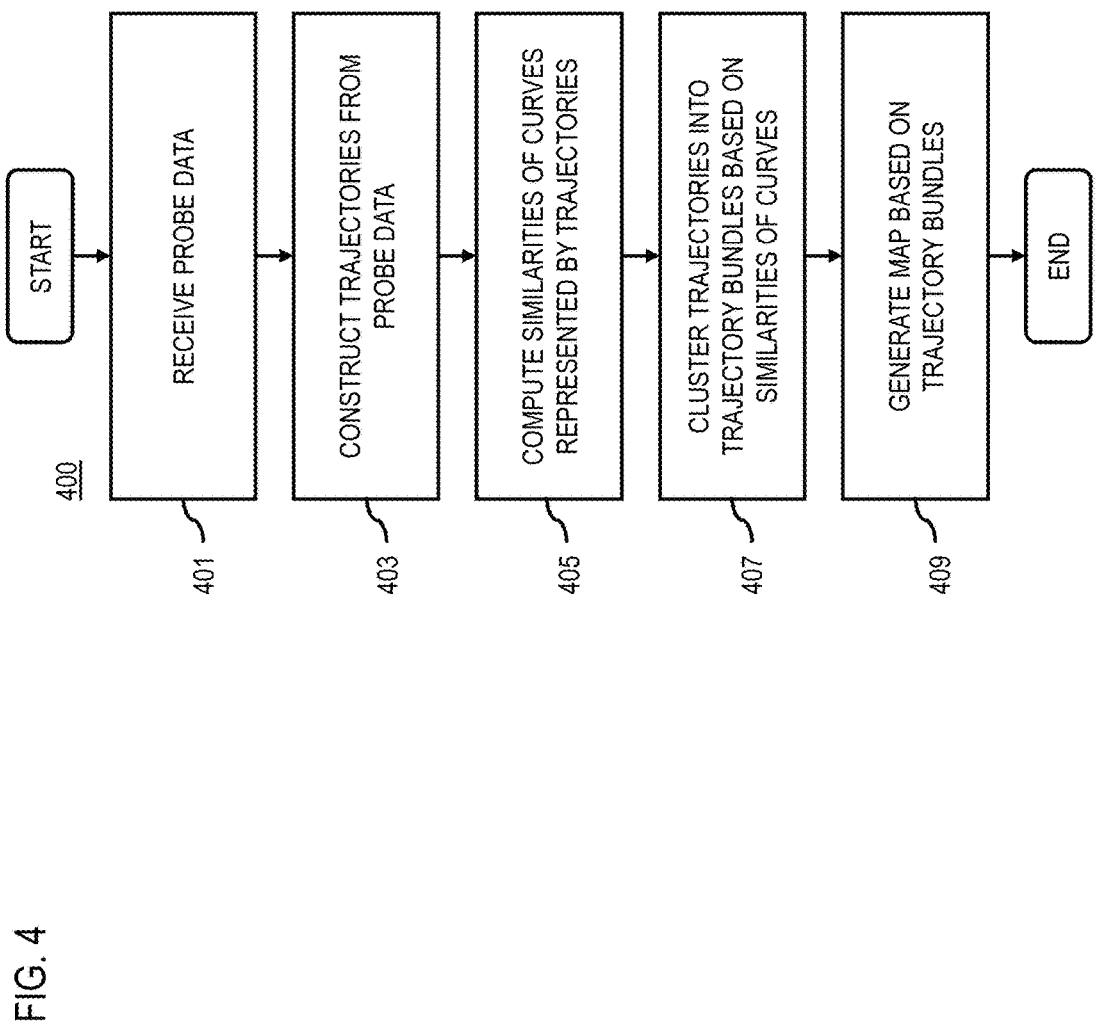
FIG. 4 is a flowchart of a process for providing trajectory bundles for map data analysis, according to one embodiment.
Figure 15:
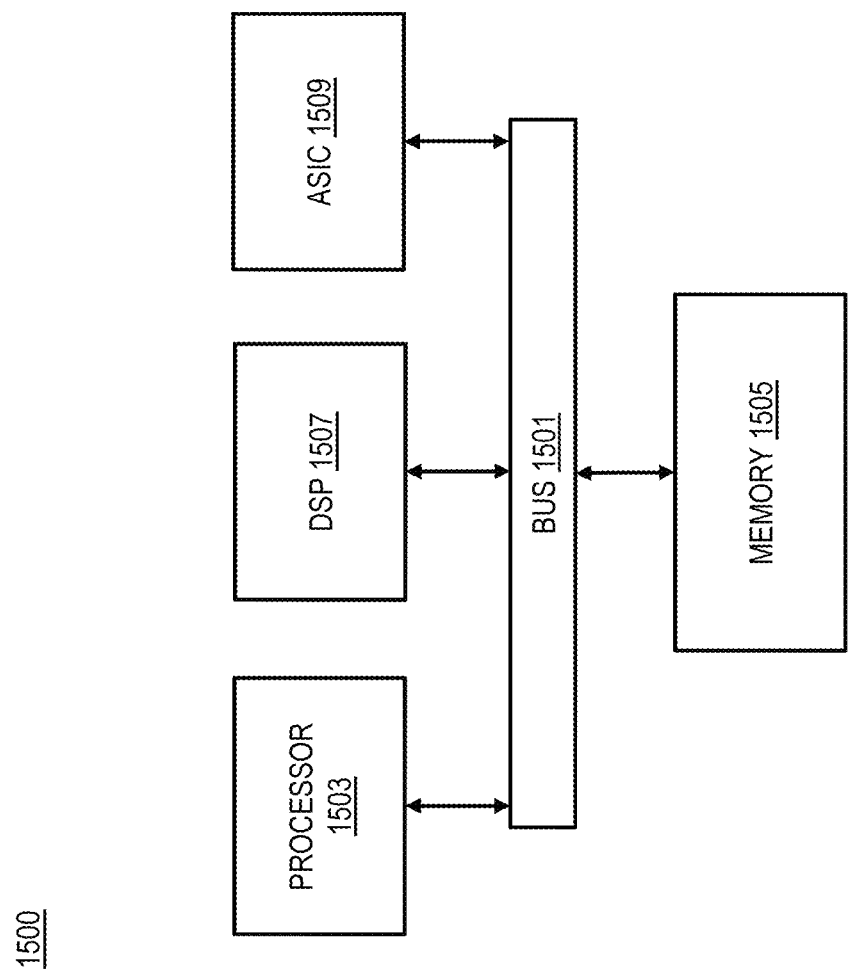
FIG. 15 is a diagram of a chip set that can be used to implement an embodiment of the invention.

FIG. 4 is a flowchart of a process for extraction and classification of probe parameter values from one or more clips of trajectories for determining a point of interest, according to one embodiment. In one embodiment, the mapping platform 107 performs the process 400 and is implemented in, for instance, a chip set including a processor and a memory as shown in FIG. 15.

In step 401, the mapping platform 107 receives probe data associated with the bounded geographic area. In one embodiment, the probe data are collected from one or more sensors of a plurality of devices (e.g., vehicles 101, UEs 103, etc.) traveling in the bounded geographic area. As previously discussed, the probe data includes probe points indicating a position, a heading, a speed, a time, or a combination thereof of each of the plurality of devices.

In one embodiment, the mapping platform 107 receives an input specifying a geo-coordinate of an intersection or a highway interchange. The bounded geographic area is designated based on the geo-coordinate. For example, the specified geo-coordinate can be designated as the center point of the bounded area with the bounded area encompassing a predetermined distance from the center point (e.g., 200 meters). In another embodiment, the geometry of any known road features can be used to determine the extent of the bounded geographic area from which probe data is collected or retrieved. For example, if the geo-coordinate is centered on a highway interchange, the radius of the bounded geographic area can be set based on a furthest extent of interchange. Under this embodiment, the mapping platform 107 can query the geographic database 109 or other map database for the extent of the interchange or other specified feature, and then set the bounded area based on the result of the query.

In step 403, the mapping platform 107 constructs a plurality of trajectories from the probe points for said each of the plurality of devices. In one embodiment, the plurality of trajectories represent respective movement paths of said each of the plurality of devices within the bounded geographic area. As previously discussed, the probe data are typically identified with a probe provider and/or probe identifier for each probe point. Accordingly, to construct the trajectory, the mapping platform 107 correlates the probe points associated with each individual probe provider and/or probe identifier. All of the probe points associated with a single probe identifier can then be sequenced based on time to construct the trajectory. In one embodiment, the trajectory can be created by connecting each probe point with a line segment. Alternatively, the mapping platform can use a curve fitting algorithm (e.g., Bezier curves) or any other process to connect the probe points into a trajectory. Because the individual probe points include additional information such as speed, heading, tilt, etc., the trajectory will also retain these properties or attributes.

In step 405, the mapping platform 107 computes similarities among a plurality of curves represented by the plurality of trajectories. In one embodiment, the similarities among the plurality of curves is computed using a discrete Frechet distance, a dynamic time warping analysis, or a combination thereof. In another embodiment, the similarities among the plurality of curves is based on a curve shape without considering an underlying map topology.

In step 407, the mapping platform 107 clusters the plurality of trajectories into one or more trajectory bundles based on the similarities, wherein the one or more trajectory bundles respectively represent a possible maneuver within the bounded geographic area. As previously described, the clustering can be based on any clustering method such as DBSCAN, OPTICS, spectral clustering, and the like. Moreover, in one embodiment, the clustering can be based on additional attributes beyond curve similarity. For example, if probe speed or relative time is also used in clustering, the resulting trajectory bundles will be clustered based on both curve shape and speed/relative time to distinguish possible maneuvers that are performed along the same path but occurring at different speeds or at different times. In an embodiment where the bounded geographic area is based on intersection, highway interchange, etc., the possible maneuver is a maneuver through the intersection or the highway interchange.

In step 409, the mapping platform 107 generates a map of the bounded geographic area based on the one or more trajectory bundles.

Figure 5:
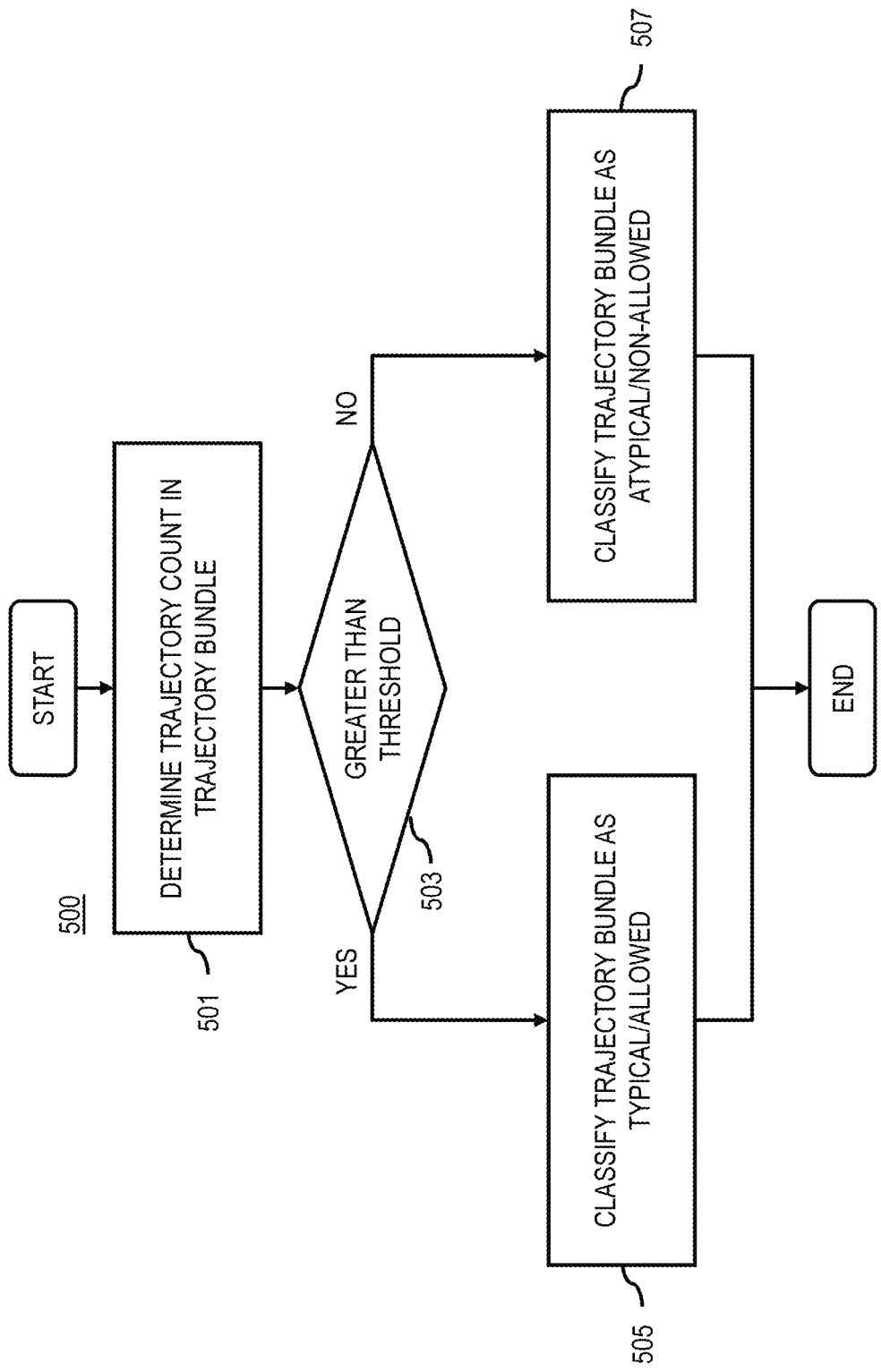
FIG. 5 is a flowchart of a process for classifying trajectory bundles as typical/allowed versus atypical/non-allowed, according to one embodiment.

FIG. 5 is a flowchart of a process for classifying trajectory bundles as typical/allowed versus atypical/non-allowed, according to one embodiment. In one embodiment, the mapping platform 107 performs the process 500 and is implemented in, for instance, a chip set including a processor and a memory as shown in FIG. 15.

In step 501, the mapping platform 107 determines trajectory counts for trajectory bundles that are respectively associated with possible maneuvers. In other words, once the mapping platform 107 has clustered the trajectories to create bundles, the mapping platform 107 can evaluate how many trajectories are included in each determined trajectory bundle. In one embodiment, the mapping platform 107 can set a minimum number of trajectories to create a bundle so that if any bundle has less than a minimum number of trajectories, the bundle can be discarded or otherwise held in interim status until the minimum number trajectories is reached.

In step 503, the mapping platform 107 compares the trajectory count to a threshold value for classifying the trajectory bundle. In one embodiment, the classification threshold value can be based on what type of classification is to be performed. In one embodiment, the threshold value can be learned (e.g., via machine learning) from observed or training data. In addition or alternatively, the threshold value can be set by a system administrator to tune the classification based on observed results.

In one embodiment, the classification is whether a maneuver associated with a trajectory bundle is typical/atypical or allowed/non-allowed based on, e.g., traffic rules. Accordingly, in step 505, the mapping platform 107 classifies the possible maneuver associated with the one or more trajectory bundles that have a trajectory count above a threshold value as a typical/allowed maneuver. In step 507, the mapping platform 107 classifies the possible maneuver associated with the one or more trajectory bundles that have a trajectory count below a threshold value as an atypical/non-allowed maneuver.

Figure 6:
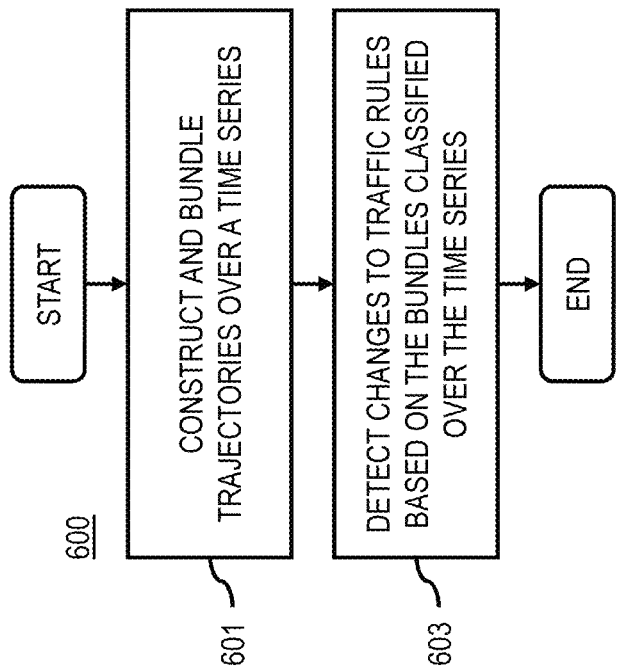
FIG. 6 is a flowchart of a process for detecting changes to traffic rules based on trajectory bundles classified over a time series, according to one embodiment.

FIG. 6 is a flowchart of a process for detecting changes to traffic rules based on trajectory bundles classified over a time series, according to one embodiment. In one embodiment, the mapping platform 107 performs the process 600 and is implemented in, for instance, a chip set including a processor and a memory as shown in FIG. 15.

In step 601, the mapping platform 107 constructs and clusters the plurality of trajectories into the one or more trajectory bundles over a time series. By way of example, when determining what probe data to use or process, the mapping platform 107 can specify the time range that the probe data should cover. This time range can specify particular dates as well as a time span for the range. For example, the time range can start on January 1 and span two weeks. To construct trajectory bundles over a time series, the mapping platform 107 can specify multiple time ranges of interest that comprise the time series. For example, a time series may specify probe data collected from a two week period at the beginning of each calendar quarter. Each tranche of probe data from each time range can then be processed into trajectory bundles independently.

In step 603, the mapping platform 107 detects changes in one or more traffic rules based on the one or more trajectory bundles classified over the time series. In other words, the mapping platform 107 can analyze differences in trajectory counts for trajectory bundles that represent the same possible maneuver over each time range in the time series. For example, in a first time range in the time series, a trajectory bundle for a possible maneuver may include a relatively low trajectory count, indicating that maneuver is likely not allowed. The pattern of low trajectory count continues for the next two time ranges may remain stable at a relatively low count. Then a subsequent time range indicates a spike to a relatively high trajectory count for a trajectory bundle associated with the same possible maneuver. In this case, the mapping platform 107 can be configured to detect that a change in traffic rule has taken place to allow the maneuver that was previously not allowed.

Figure 7:
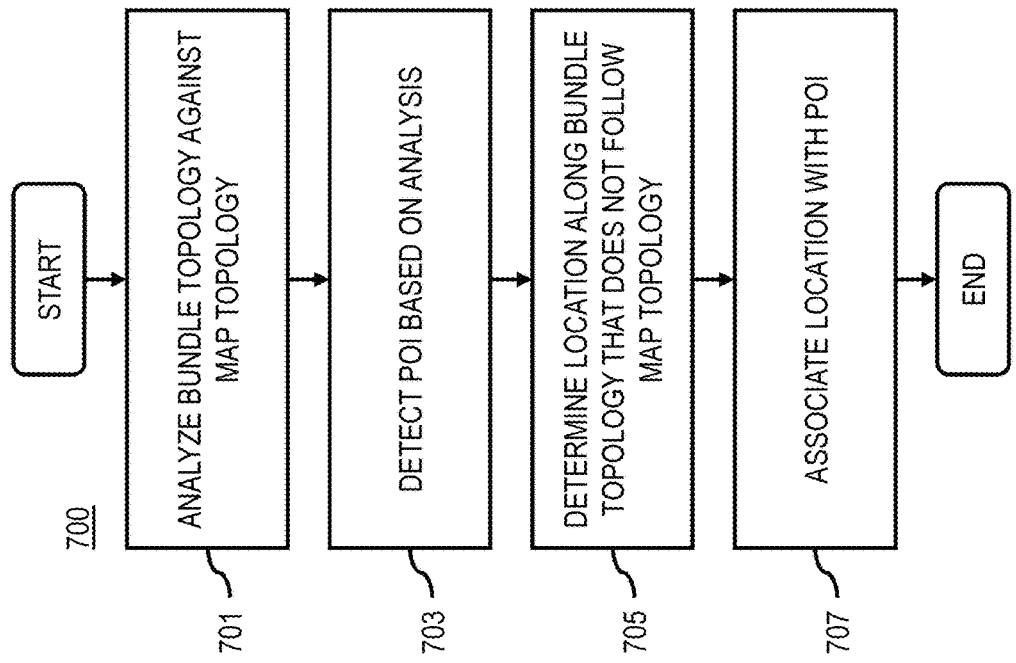
FIG. 7 is a flowchart of a process for detecting a point of interest based on bundle topology, according to one embodiment.

FIG. 7 is a flowchart of a process for detecting a point of interest based on bundle topology, according to one embodiment. In one embodiment, the mapping platform 107 performs the process 700 and is implemented in, for instance, a chip set including a processor and a memory as shown in FIG. 15.

In step 701, the mapping platform 107 performs an analysis of a bundle topology of the one or more trajectory bundles with respect to a map topology determined from mapping data. For example, the mapping platform 107 can determine whether the shape or topology of the trajectory bundle follows the shape or topology of a known road network in the area of interest. In one embodiment, the analysis by the mapping platform 107 can simply detect a deviation beyond a threshold value. In addition or alternatively, the analysis can detect the type of nature of the deviation. For example, based on the shape, heading, speed, etc. of the trajectories in the trajectory bundle at the point of deviation, the mapping platform 107 identifies specific types of travel or driving behaviors, or actions taken by a probe. The behaviors or actions can include making a U-turn in a parking lot, parking in a parking spot (e.g., indicated by a three-point turn or other path indicative of parking), etc.

In step 703, the mapping platform 107 detects a point of interest in the geographic bounded area based on the analysis. In one embodiment, if the analysis indicates a deviation, behavior, action, maneuver, etc. associated with a POI, then the mapping platform 107 can be configured to infer that a POI has been detected. In one embodiment, the types of deviations, etc. that are indicative of a POI can be learned from data through machine learning or can be configured by a system administrator.

In step 705, the mapping platform 107 determines a location along the bundle topology that does not follow the map topology. For example, the mapping platform 107 can determine which geo-coordinates are associated with the portion of the trajectory bundle associated with the deviation. In one embodiment, if the location of the deviation spans a large distance, the mapping platform 107 can further analyze the characteristics of the deviation to determine a location. For example, a reversal of direction at a point in the deviation may indicate a place where the probe stopped at a POI before continuing on a trip. In step 707, the mapping platform 107 associates this location with the detected point of interest.

Figure 8:
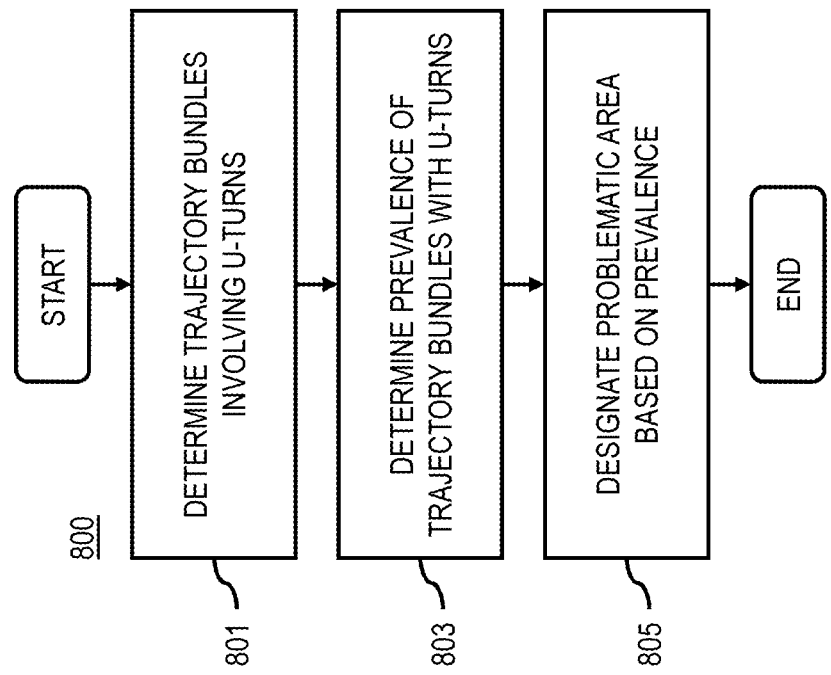
FIG. 8 is a flowchart of a process for detecting a problematic area based on trajectory bundles, according to one embodiment.

FIG. 8 is a flowchart of a process for detecting a problematic area based on trajectory bundles, according to one embodiment. In one embodiment, the mapping platform 107 performs the process 800 and is implemented in, for instance, a chip set including a processor and a memory as shown in FIG. 15.

In step 801, the mapping platform 107 determines a subset of the one or more bundles that involve a U-turn maneuver or other maneuver that is indicative of a navigation problems or difficulties within the area of interest. Examples of other such maneuver include, but are not limited to, multiple self-intersections, unexpected deceleration or acceleration, looping or repeating travel segments, etc.

In step 803, the mapping platform 107 determines a prevalence of the subset of the one or more bundles associated with the U-turn with respect to an entirety of the one or more bundles. In one embodiment, the prevalence is expressed as a weight value of the trajectory bundles with the problematic maneuvers (e.g., u-turns) with respect to the overall number bundles detected for the area, intersection, interchange, etc.

In step 805, the mapping platform 107 designates the one or more geographic bounded areas, one or more map features within the one or more geographic bounded areas, or a combination thereof as a problematic area based on the prevalence. In one embodiment, the designation is based on whether the prevalence or weight value is above a threshold value. As discussed with respect other threshold values described above, the prevalence threshold value can be based on machine learning from observed data against ground truths. For example, trajectory bundles for areas that are known to be problematic can be constructed and analyzed to determine what their respective prevalence or weight values for bundles with problematic maneuvers are. The threshold can then be set based on the prevalence values computed for the known problematic areas.

Figure 9:
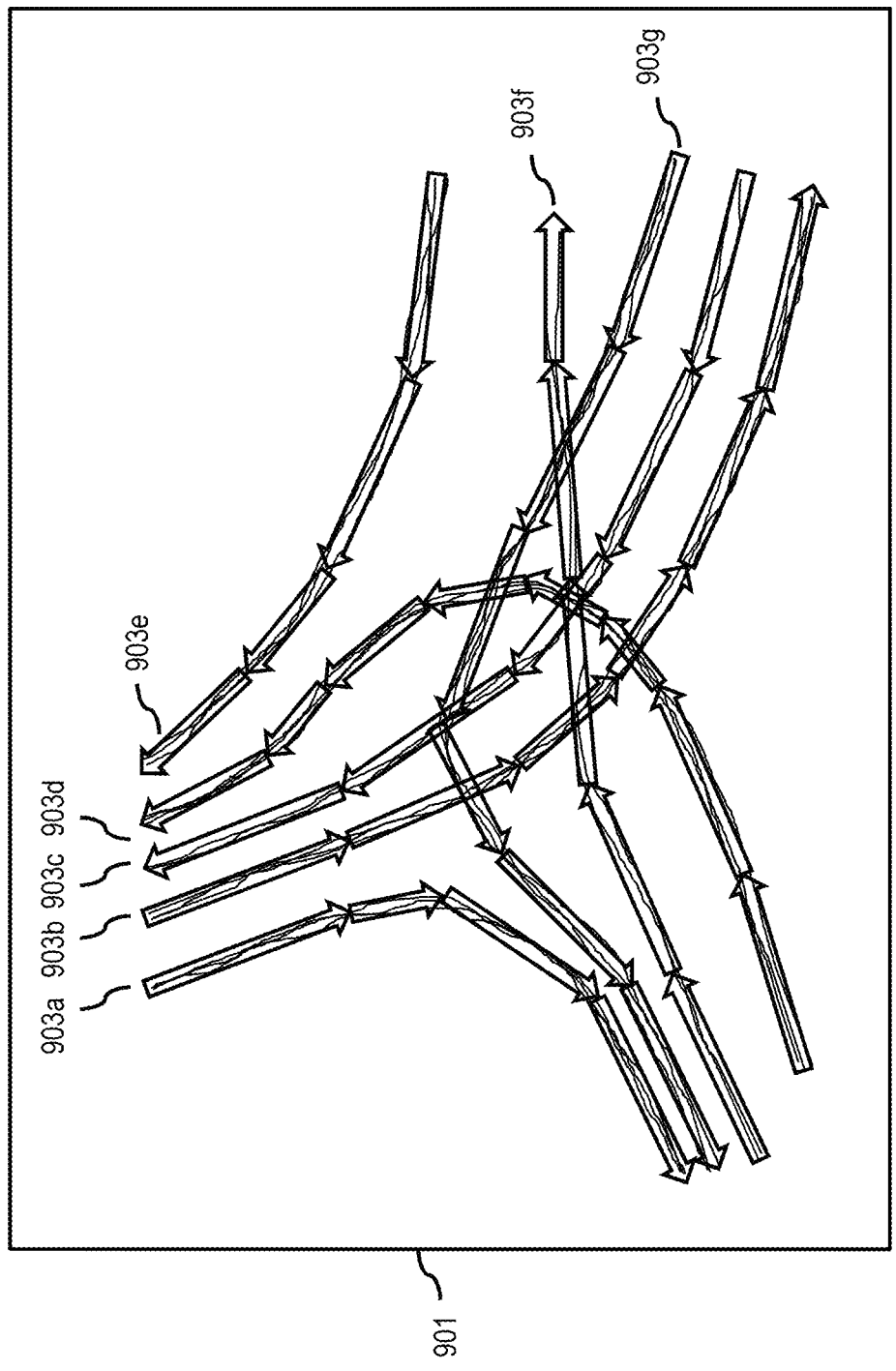
FIG. 9 is a diagram illustrating a mapping of trajectory bundles, according to one embodiment.

FIG. 9 is a diagram illustrating a mapping of trajectory bundles, according to one embodiment. As previously discussed, the mapping platform 107 can use the trajectory bundles created from probe data to automatically map a given area. The example of FIG. 9 illustrates a map 901 of an area that includes a highway interchange. As shown, the map 901 is not based on and does not depict a map of the topology of a road network of the highway interchange. Instead, the map 901 depicts trajectory bundles 903a-903g (also collectively referred to as trajectory bundles 903) that each represent a possible maneuver through the interchange. This visual depiction of the trajectory bundles 903 also provides a visual map of the interchange without having to reference or know the physical topology of the interchange.

In addition, each trajectory bundle 903 is a cluster of similar trajectories that have been grouped according to their computed curve similarities (e.g., discrete Frechet distances) using a cluster method as previously described. In one embodiment, the clustering accounts for both curve shape and trajectory heading, which enables the mapping platform 107 to distinguish between similarly shaped trajectories that are heading in opposite directions. For example, trajectory bundles 903b and 903c share a similar shape, but are nonetheless clustered as separate but proximate bundles because their respective trajectories are moving in opposite directions or headings.

Figure 10:
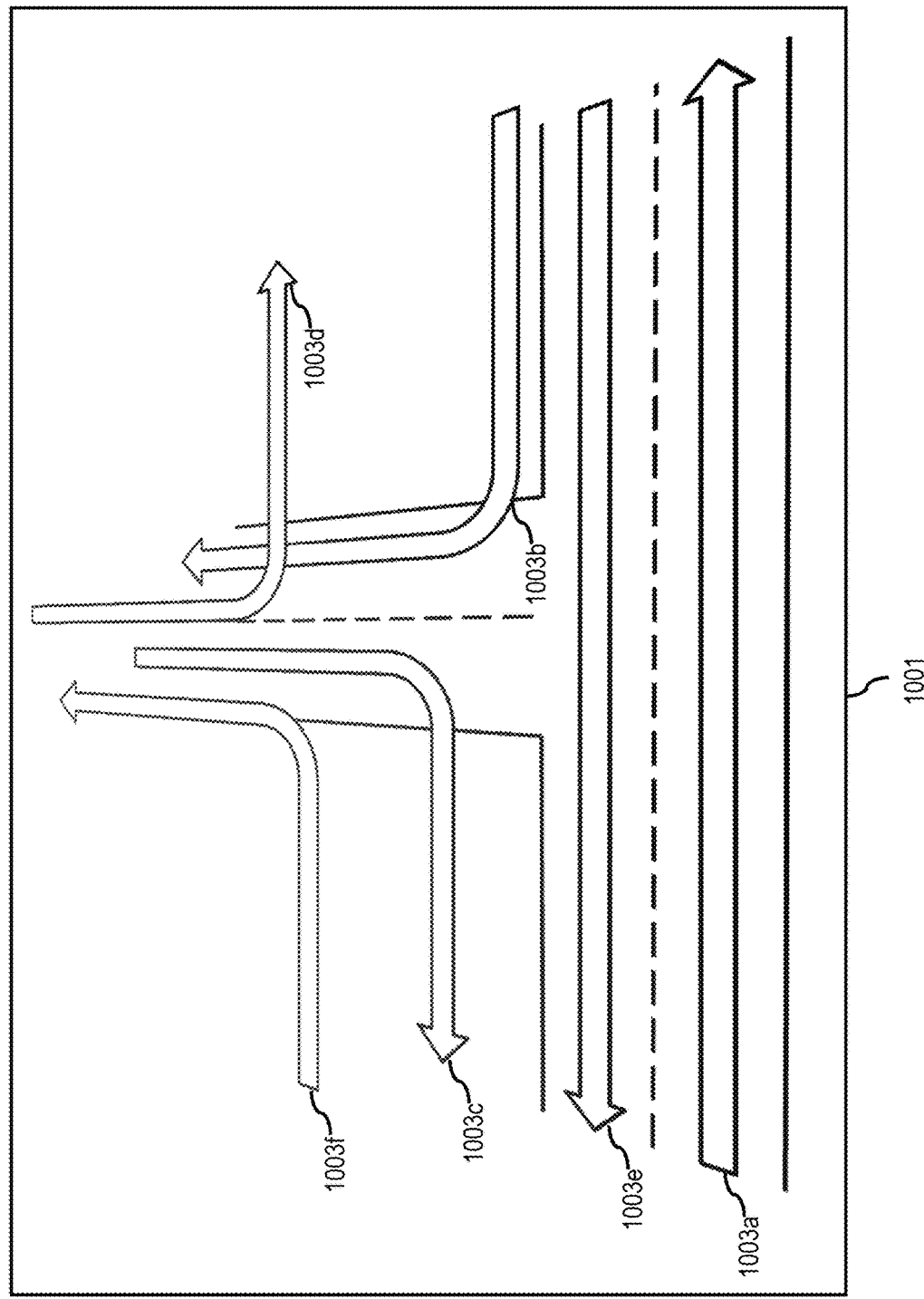
FIG. 10 is a diagram illustrating trajectory bundles determined at an intersection, according to one embodiment.

FIG. 10 is a diagram illustrating trajectory bundles determined at an intersection, according to one embodiment. The map 1001 is a mapping of trajectory bundles 1003a-1003f (also collectively referred to as trajectory bundles 1003) at an intersection in which the trajectory bundles 1003 are visualized with artificial elevation for disambiguation. In this example, the bundles 1003 are created according to the embodiments described herein and are mapped to an intersection. As discussed above, the trajectory bundles are clustered based on at least curve shape and heading. For example, bundles 1003a and 1003e have similar shape and spatial location but are in opposite directions or headings. Similarly, the pair of bundles 1003b and 1003d; and the pair of bundles 1003c and 1003f each have similar shapes but have different directions or headings. These each bundle is clustered separately.

Figure 11:
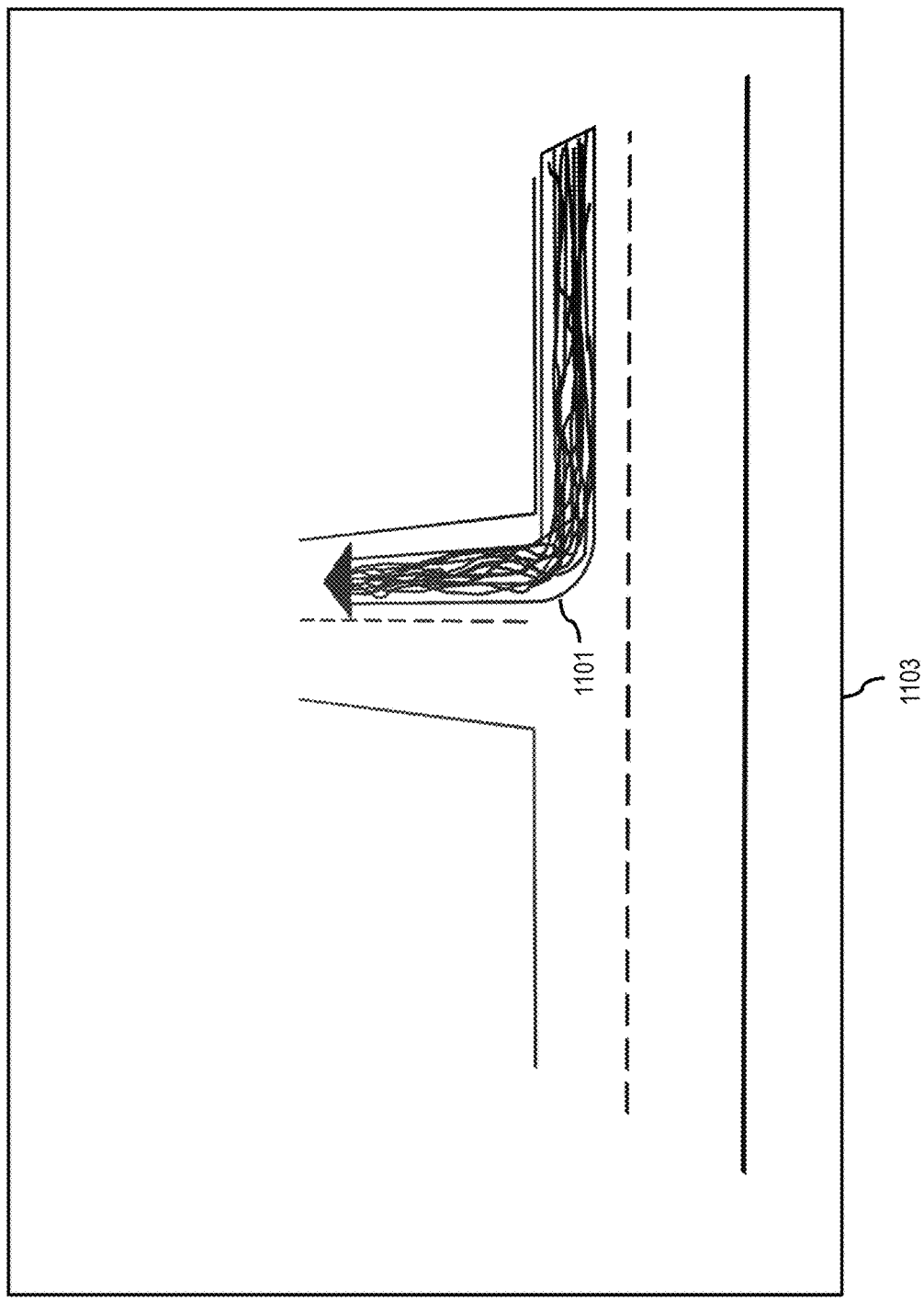
FIG. 11 is a diagram illustrating a potential maneuver associated with a trajectory bundle, according to one embodiment.

FIG. 11 is a diagram illustrating a potential maneuver associated with a trajectory bundle, according to one embodiment. The trajectory bundle 1101 in map 1103 represents a possible turn at the intersection. In this example, the mapping platform 107 clustered all trajectories with this shape and heading to make the turn into the trajectory bundle 1101. Although the trajectory 1101 is depicted as being overlaid on a depiction of the intersection, the actual map topology of the intersection is not used to construct the trajectories from the probe data or cluster the trajectories according to a curve similarity to represent the turning maneuver at the intersection.

Figure 12:
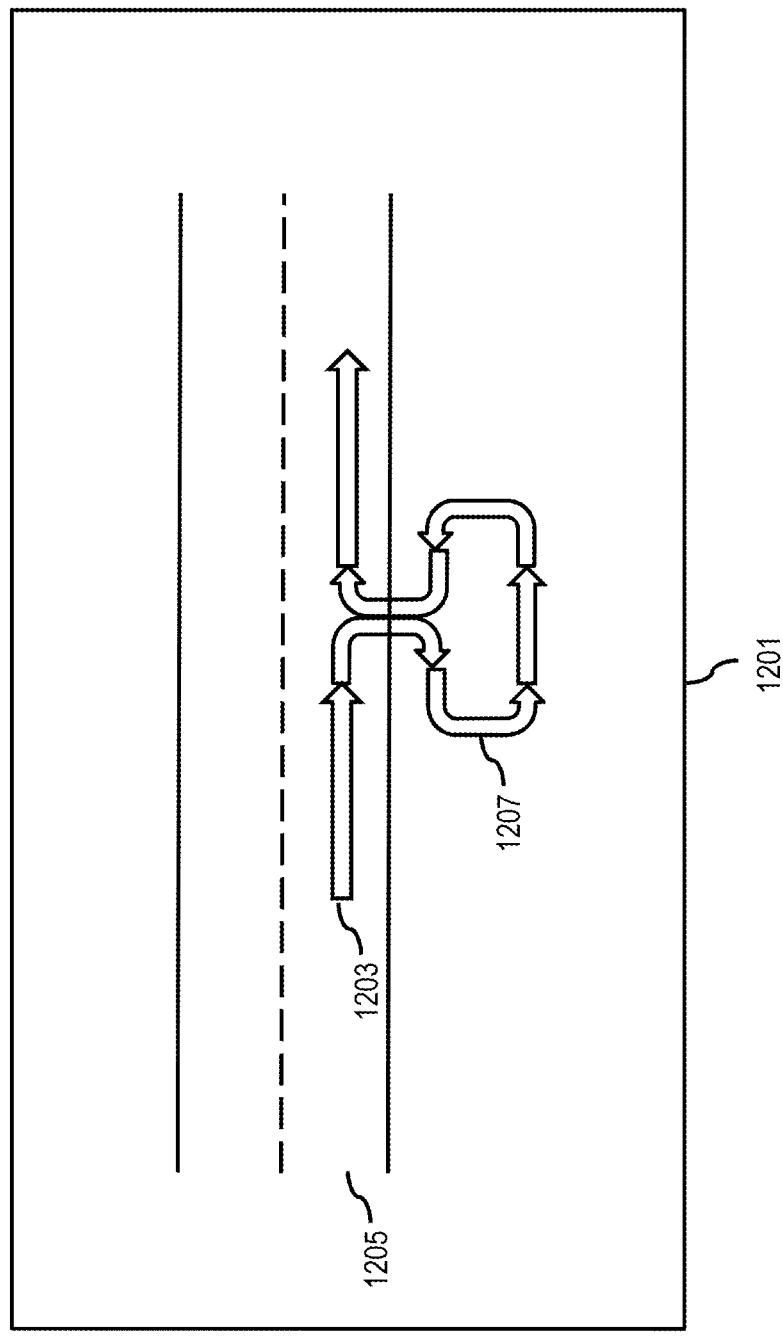
FIG. 12 is a diagram illustrating a trajectory bundle used for detecting a point of interest, according to one embodiment.

FIG. 12 is a diagram illustrating a trajectory bundle used for detecting a point of interest, according to one embodiment. As shown, the map 1201 depicts a trajectory bundle 1203 that is overlaid on a map topology 1205 (e.g., a topology indicating a road network). In one embodiment, the mapping platform 107 compares the topology of the bundle 1203 to the map topology 1205 and detects a deviation of the bundle topology 1203 from the map topology 1205 indicated by the kink 1207 depicted in the map 1201. Based on this detected deviation and kink 1207, the mapping platform 107 can infer an existence of a POI at the location of the deviation by determining, e.g., that the kink 1207 corresponds to a U-turn at a quick stop, which is a pattern that the mapping platform 107 has learned or is otherwise configured to be associated with detecting POIs.

Figure 13A:
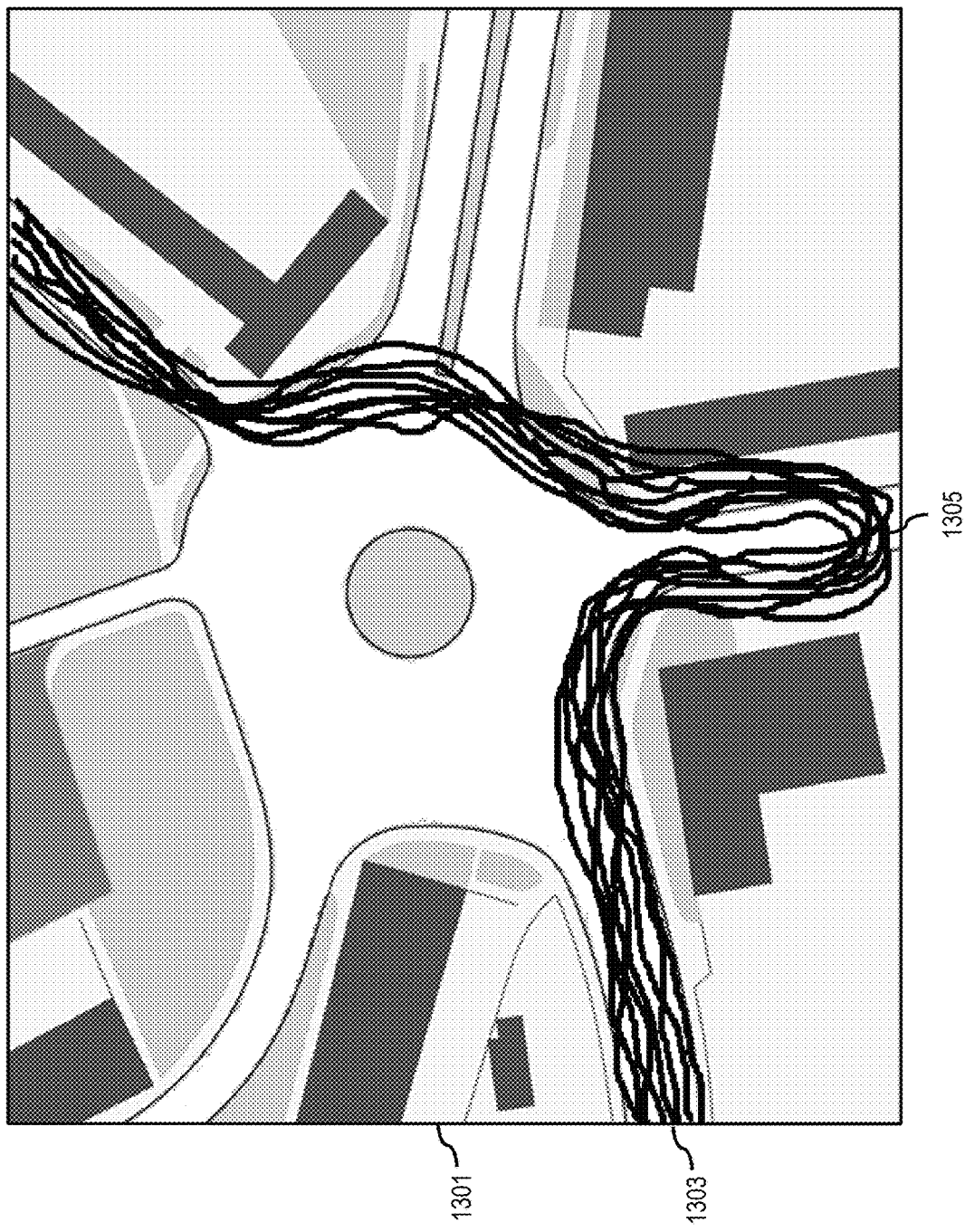
FIGS. 13A and 13B are diagrams illustrating trajectory bundles associated with a problematic area, according to one embodiment.
Figure 13B:
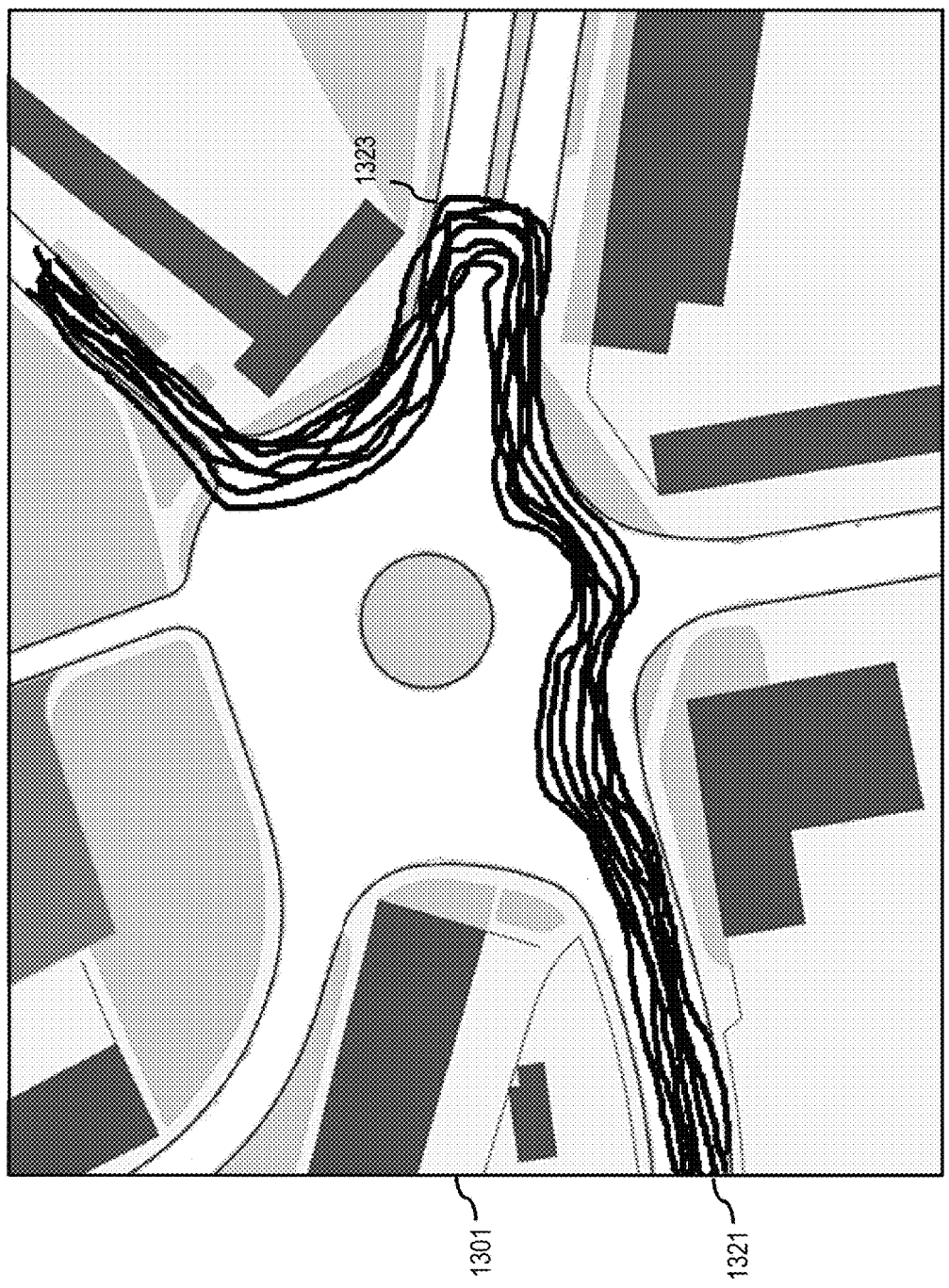

FIGS. 13A and 13B are diagrams illustrating trajectory bundles associated with a problematic area, according to one embodiment. In one embodiment, the mapping platform 107 can analyze trajectory bundles to determine whether a given area is problematic for traveling or navigation. As shown, in FIGS. 13A and 13B, a map 1301 depicts a roundabout with multiple interconnected roads. FIG. 13A depicts a trajectory bundle 1303 constructed from probe data that traces a complex driving maneuver around the roundabout. In this example, the mapping platform 107 analyzes the trajectory bundle 1303 for any maneuvers that are indicative of a navigation issue or problem and detects a U-turn associated with the trajectory bundle 1303 at U-turn point 1305. FIG. 13B depicts another trajectory bundle 1321 traversing the same roundabout but with a U-turn point 1323 detected at another location. Because of the prevalence of the detected problematic maneuver (e.g., a U-turn) in at least two trajectory bundles (e.g., bundles 1303 and 1321), the mapping platform 107 may designate or classify the roundabout as a problematic area. In one embodiment, a designation of the roundabout as a problematic can trigger a review of the design of the roundabout to improve traffic flow through the area.

The processes described herein for providing trajectory bundles for map data analysis may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
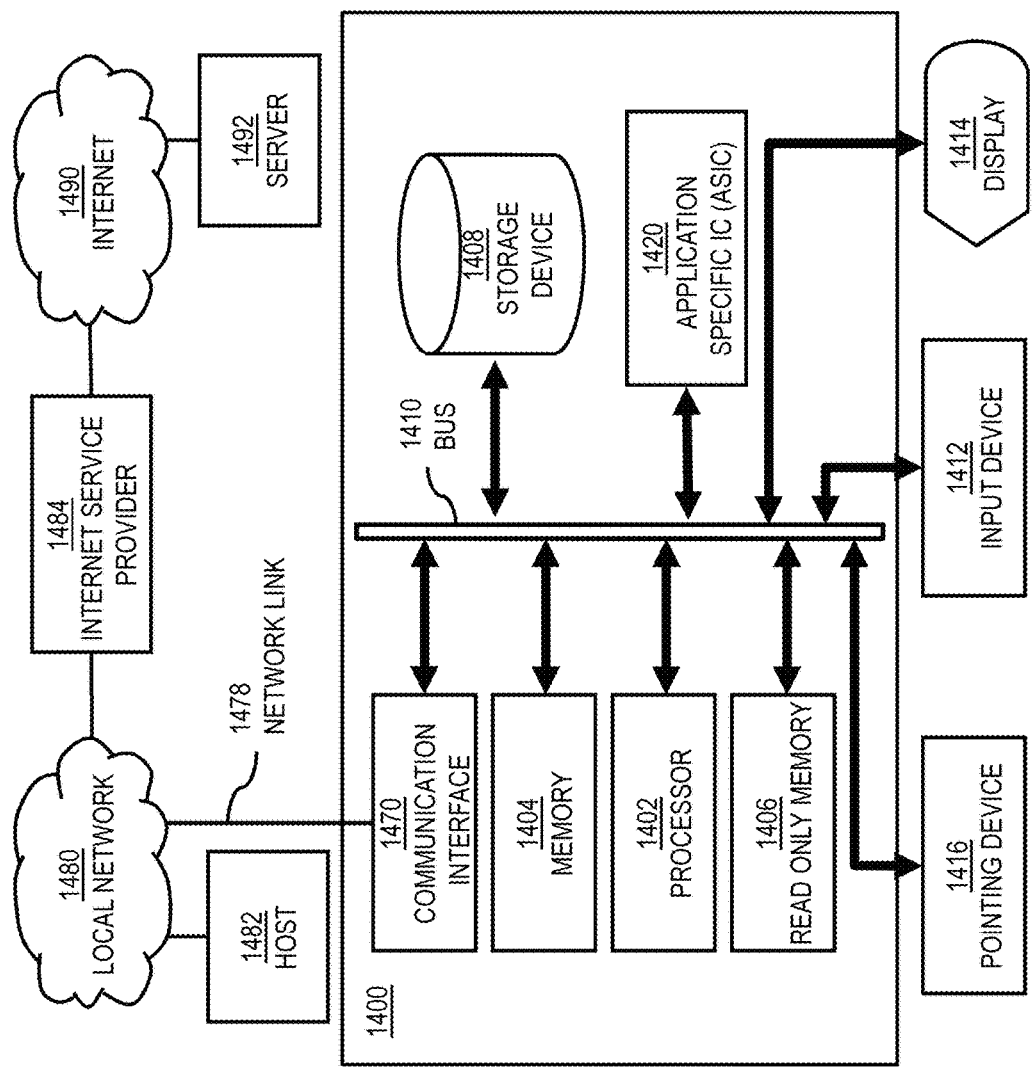
FIG. 14 is a diagram of hardware that can be used to implement an embodiment of the invention.

FIG. 14 illustrates a computer system 1400 upon which an embodiment of the invention may be implemented. Computer system 1400 is programmed (e.g., via computer program code or instructions) to provide trajectory bundles for map data analysis as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to providing trajectory bundles for map data analysis. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or other dynamic storage device, stores information including processor instructions for providing trajectory bundles for map data analysis. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for providing trajectory bundles for map data analysis, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 105 for providing trajectory bundles for map data analysis.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 15 illustrates a chip set 1500 upon which an embodiment of the invention may be implemented. Chip set 1500 is programmed to provide trajectory bundles for map data analysis as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to provide trajectory bundles for map data analysis. The memory 1505 also stores the data associated with or generated by the execution of the inventive steps.

Figure 16:
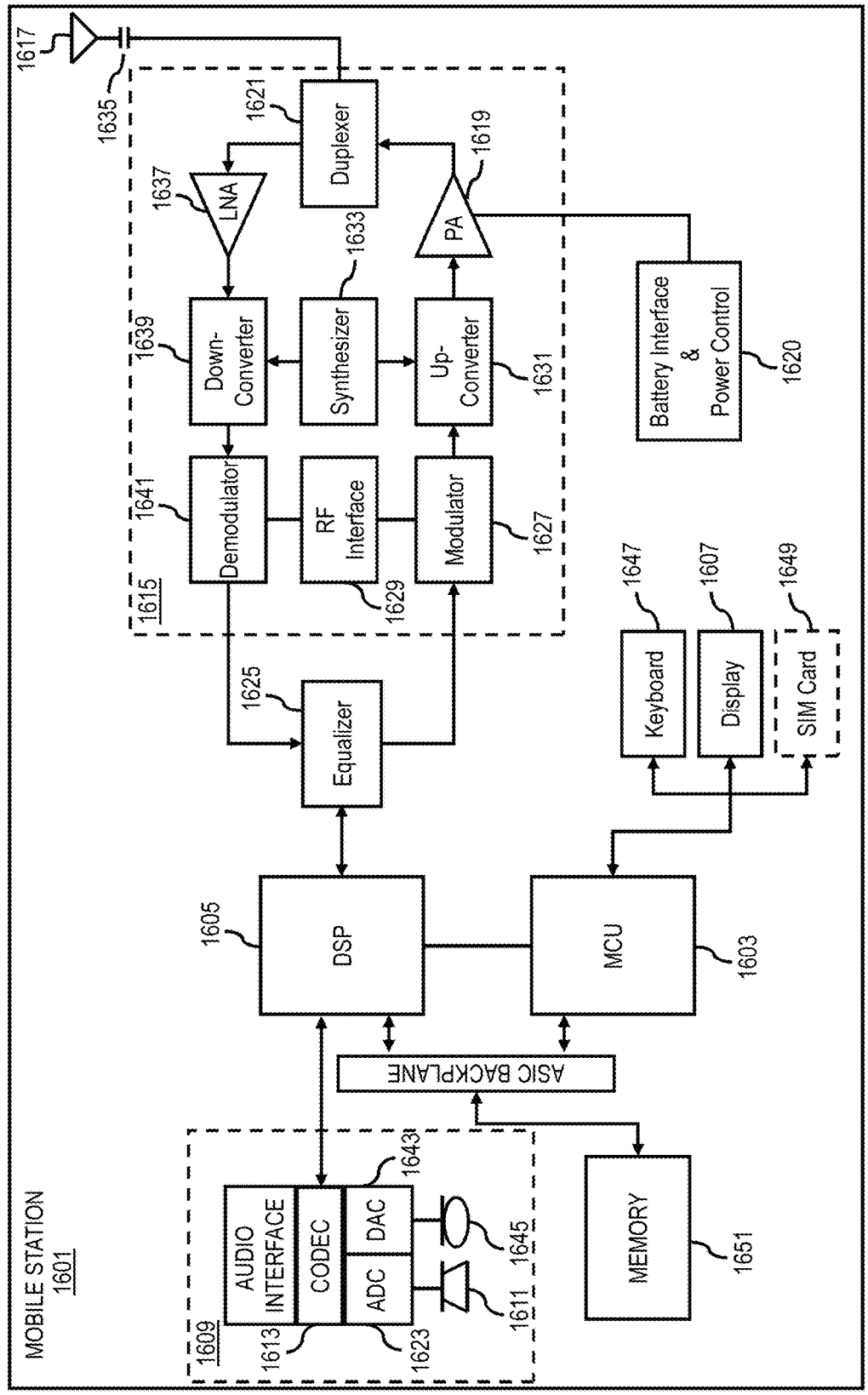
FIG. 16 is a diagram of a mobile terminal (e.g., handset) that can be used to implement an embodiment of the invention.

FIG. 16 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile station functions that offer automatic contact matching. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile station 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile station 1601 to provide trajectory bundles for map data analysis. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the station. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile station 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile station 1601 on a radio network. The card 1649 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for generating map data to represent a bounded geographic area comprising:
   receiving probe data associated with the bounded geographic area, wherein the probe data are collected from one or more sensors of a plurality of devices traveling in the bounded geographic area, and wherein the probe data include probe points indicating a position, a heading, a speed, a time, or a combination thereof of each of the plurality of devices;
   constructing a plurality of trajectories from the probe points for said each of the plurality of devices, wherein the plurality of trajectories represents respective movement paths of said each of the plurality of devices within the bounded geographic area;
   computing similarities among a plurality of curves represented by the plurality of trajectories;
   clustering the plurality of trajectories into one or more trajectory bundles based on the similarities, wherein the one or more trajectory bundles respectively represent a possible maneuver within the bounded geographic area;
   generating a map of the bounded geographic area based on the one or more trajectory bundles;
   determining a subset of the one or more bundles that involve a problem maneuver;
   determining a prevalence of the subset of the one or more bundles associated with the problem maneuver with respect to an entirety of the one or more bundles; and
   designating the one or more geographic bounded areas, one or more map features within the one or more geographic bounded areas, or a combination thereof as a problematic area based on the prevalence.

2. The method of claim 1, wherein the similarities among the plurality of curves are computed using a discrete Frechet distance, a dynamic time warping analysis, or a combination thereof.

3. The method of claim 1, wherein the similarities among the plurality of curves are based on a curve shape without considering an underlying map topology.

4. The method of claim 1, further comprising:
receiving an input specifying a geo-coordinate of an intersection or a highway interchange,
wherein the bounded geographic area is designated based on the geo-coordinate, and
wherein the possible maneuver is a maneuver through the intersection or the highway interchange.

5. The method of claim 1, further comprising:
classifying the possible maneuver associated with the one or more trajectory bundles that have a trajectory count above a threshold value as a typical/allowed maneuver.

6. The method of claim 1, further comprising:
classifying the possible maneuver associated with the one or more trajectory bundles that have a trajectory count below a threshold value as an atypical/non-allowed maneuver.

7. The method of claim 1, further comprising:
constructing and clustering the plurality of trajectories into the one or more trajectory bundles over a time series; and
detecting changes in one or more traffic rules based on the one or more trajectory bundles classified over the time series.

8. The method of claim 1, further comprising:
performing an analysis of a bundle topology of the one or more trajectory bundles with respect to a map topology determined from mapping data; and
detecting a point of interest in the geographic bounded area based on the analysis.

9. The method of claim 8, further comprising:
determining a location along the bundle topology that does not follow the map topology; and
associating the location with the detected point of interest.

10. The method of claim 1,
wherein the problem maneuver includes a U-turn maneuver.

11. An apparatus for generating map data to represent a bounded geographic area comprising:
at least one processor; and
at least one memory including computer program code for one or more programs,
the at least one memory and the computer program code configured to, with the at least one processor, cause the apparatus to perform at least the following,
receive probe data associated with the bounded geographic area, wherein the probe data are collected from one or more sensors of a plurality of devices traveling in the bounded geographic area, and wherein the probe data include probe points indicating a position, a heading, a speed, a time, or a combination thereof of each of the plurality of devices;
construct a plurality of trajectories from the probe points for said each of the plurality of devices, wherein the plurality of trajectories represents respective movement paths of said each of the plurality of devices within the bounded geographic area;
compute similarities among a plurality of curves represented by the plurality of trajectories;
cluster the plurality of trajectories into one or more trajectory bundles based on the similarities, wherein the one or more trajectory bundles respectively represent a possible maneuver within the bounded geographic area;
generate a map of the bounded geographic area based on the one or more trajectory bundles;
determine a subset of the one or more bundles that involve a problem maneuver;
determine a prevalence of the subset of the one or more bundles associated with the problem maneuver with respect to an entirety of the one or more bundles; and
designate the one or more geographic bounded areas, one or more map features within the one or more geographic bounded areas, or a combination thereof as a problematic area based on the prevalence.

12. The apparatus of claim 11, wherein the similarities among the plurality of curves are computed using a discrete Frechet distance, a dynamic time warping analysis, or a combination thereof.

13. The apparatus of claim 11, wherein the similarities among the plurality of curves are based on a curve shape without considering an underlying map topology.

14. The apparatus of claim 11, wherein the apparatus is further caused to:
receive an input specifying a geo-coordinate of an intersection or a highway interchange,
wherein the bounded geographic area is designated based on the geo-coordinate, and
wherein the possible maneuver is a maneuver through the intersection or the highway interchange.

15. The apparatus of claim 11, wherein the apparatus is further caused to:
classify the possible maneuver associated with the one or more trajectory bundles that have a trajectory count above a threshold value as a typical/allowed maneuver; and
classify the possible maneuver associated with the one or more trajectory bundles that have a trajectory count below a threshold value as an atypical/non-allowed maneuver.

16. The apparatus of claim 11, wherein the apparatus is further caused to:
perform an analysis of a bundle topology of the one or more trajectory bundles with respect to a map topology determined from mapping data; and
detect a point of interest in the geographic bounded area based on the analysis.

17. The apparatus of claim 11, wherein the problem maneuver includes a U-turn maneuver.

18. A non-transitory computer-readable storage medium carrying one or more sequences of one or more instructions which, when executed by one or more processors, cause an apparatus to at least perform the following steps:
receiving probe data associated with the bounded geographic area, wherein the probe data are collected from one or more sensors of a plurality of devices traveling in the bounded geographic area, and wherein the probe data include probe points indicating a position, a heading, a speed, a time, or a combination thereof of each of the plurality of devices;
constructing a plurality of trajectories from the probe points for said each of the plurality of devices, wherein the plurality of trajectories represents respective movement paths of said each of the plurality of devices within the bounded geographic area;
computing similarities among a plurality of curves represented by the plurality of trajectories;
clustering the plurality of trajectories into one or more trajectory bundles based on the similarities, wherein the one or more trajectory bundles respectively represent a possible maneuver within the bounded geographic area;

generating a map of the bounded geographic area based on the one or more trajectory bundles;

determining a subset of the one or more bundles that involve a problem maneuver;

determining a prevalence of the subset of the one or more bundles associated with the problem maneuver with respect to an entirety of the one or more bundles; and designating the one or more geographic bounded areas, one or more map features within the one or more geographic bounded areas, or a combination thereof as a problematic area based on the prevalence.

19. The non-transitory computer-readable storage medium of claim 18, wherein the apparatus is further caused to perform:

receiving an input specifying a geo-coordinate of an intersection or a highway interchange, wherein the bounded geographic area is designated based on the geo-coordinate, and wherein the possible maneuver is a maneuver through the intersection or the highway interchange.

20. The non-transitory computer-readable storage medium of claim 19, wherein the problem maneuver includes a U-turn maneuver.

* * * * *